US011559782B2

(12) United States Patent
Luke et al.

(10) Patent No.: US 11,559,782 B2
(45) Date of Patent: Jan. 24, 2023

(54) REACTIVE MEDIA

(71) Applicant: Phosphorus Free Water Solutions, LLC, Lakeland, FL (US)

(72) Inventors: Donald A. Luke, Valrico, FL (US); Timothy M. Luke, Valrico, FL (US)

(73) Assignee: Phosphorus Free Water Solutions, LLC, Lakeland, FL (US)

( * ) Notice: Subject to any disclaimer, the term of this patent is extended or adjusted under 35 U.S.C. 154(b) by 306 days.

(21) Appl. No.: 16/650,949

(22) PCT Filed: Oct. 1, 2018

(86) PCT No.: PCT/US2018/053744
§ 371 (c)(1),
(2) Date: Mar. 26, 2020

(87) PCT Pub. No.: WO2019/070575
PCT Pub. Date: Apr. 11, 2019

(65) Prior Publication Data
US 2020/0290012 A1  Sep. 17, 2020

Related U.S. Application Data

(60) Provisional application No. 62/566,858, filed on Oct. 2, 2017.

(51) Int. Cl.

| | |
|---|---|
| *B01J 20/04* | (2006.01) |
| *B01J 20/12* | (2006.01) |
| *B01J 20/30* | (2006.01) |
| *C02F 1/28* | (2006.01) |
| *C04B 35/18* | (2006.01) |
| *C04B 35/22* | (2006.01) |
| *C04B 35/626* | (2006.01) |

(52) U.S. Cl.
CPC .......... *B01J 20/043* (2013.01); *B01J 20/041* (2013.01); *B01J 20/12* (2013.01); *B01J 20/3078* (2013.01); *C02F 1/288* (2013.01); *C04B 35/18* (2013.01); *C04B 35/22* (2013.01); *C04B 35/62695* (2013.01)

(58) Field of Classification Search
CPC ........ B01J 20/043; B01J 20/041; B01J 20/12; B01J 20/3078; C02F 1/288; C02F 2101/105; C02F 1/281; C04B 35/18; C04B 35/22; C04B 2235/3208; C04B 35/16; C04B 35/62685; C03C 3/078
See application file for complete search history.

(56) References Cited

U.S. PATENT DOCUMENTS

| | | |
|---|---|---|
| 6,627,083 B2 * | 9/2003 | Rennesund ............... C02F 1/58 210/660 |
| 7,662,206 B2 | 2/2010 | Burnham |
| 7,896,953 B1 | 3/2011 | Goswami et al. |
| 7,947,104 B2 | 5/2011 | Burnham et al. |
| 8,202,342 B2 | 6/2012 | Burnham |
| 8,449,756 B2 | 5/2013 | Monzyk et al. |
| 2005/0053543 A1 | 3/2005 | Kneip et al. |
| 2011/0256029 A1 | 10/2011 | Comrie |
| 2012/0211426 A1 | 8/2012 | Santoro et al. |
| 2013/0092532 A1 | 4/2013 | Monzyk et al. |
| 2013/0098840 A1 * | 4/2013 | Helferich ............. B01J 20/3475 210/660 |
| 2013/0175224 A1 | 7/2013 | Ciampi et al. |
| 2016/0031732 A1 | 2/2016 | Ciampi et al. |

FOREIGN PATENT DOCUMENTS

| | | |
|---|---|---|
| CN | 102167460 B | 7/2012 |
| CN | 105417672 A | 3/2016 |
| CN | 105967293 A | 9/2016 |
| CN | 106335960 A | 1/2017 |
| CN | 104828924 B | 5/2017 |
| CN | 106669633 A | 5/2017 |
| EP | 0577119 A2 | 1/1994 |
| WO | WO-2014200771 A1 | 12/2014 |
| WO | WO-2016145487 A1 | 9/2016 |
| WO | WO-2019070575 A1 | 4/2019 |

OTHER PUBLICATIONS

Filtralite Data Sheet (Year: 2003).*
"International Application Serial No. PCT/US2018/053744, International Preliminary Report on Patentability dated Apr. 16, 2020", 9 pgs.
"International Application Serial No. PCT/US2018/053744, International Search Report dated Dec. 7, 2018", 2 pgs.
"International Application Serial No. PCT/US2018/053744, Written Opinion dated Dec. 7, 2018", 7 pgs.

* cited by examiner

*Primary Examiner* — Anthony J Zimmer
*Assistant Examiner* — Logan Edward Laclair
(74) *Attorney, Agent, or Firm* — Schwegman Lundberg & Woessner, P.A.

(57) ABSTRACT

Various embodiments of the present invention relate to reactive media including calcium. A reactive media includes a vitrified calcium silicate comprising reactive calcium. Various embodiments of the reactive media described herein are useful for removal of anionic impurities such as phosphate from water.

20 Claims, No Drawings

REACTIVE MEDIA

CROSS-REFERENCE TO RELATED APPLICATION

This application is a U.S. National Stage Filing under 35 U.S.C. 371 from International Patent Application Serial No. PCT/US2018/053744, filed Oct. 1, 2018. which application claims the benefit of priority to U.S. Provisional Patent Application Ser. No. 62/566,858 filed Oct. 2, 2017, the disclosures of which are incorporated herein in their entireties by reference.

BACKGROUND

Sorbent media that provide available calcium for complexation or reaction with other materials to form solid calcium salts are useful for removal of various materials from water. However, current sorbent media including reactive calcium suffer from low available concentrations of reactive calcium, high preparation expense, and low capacity for sorbtion of impurities such as phosphate or carbonate.

SUMMARY OF THE INVENTION

In various embodiments, the present invention provides a reactive media including a ceramic and reactive calcium available to form a solid calcium salt with an anionic material.

In various embodiments, the present invention provides a reactive media including a ceramic that is about 80 wt % to about 99 wt % of the reactive media. The reactive media also includes reactive calcium that is available to form a solid calcium salt at pH of about 9 to about 14 with phosphate or carbonate in aqueous solution. The reactive calcium as CaO is about 14 wt % to about 18 wt % of the reactive media, and the reactive calcium is in the form of a water-soluble salt or inorganic compound including the reactive calcium (e.g., CaO or another material).

In various embodiments, the present invention provides a method of using the reactive media. The method includes contacting water including the anionic material with the reactive media to form the solid calcium salt.

In various embodiments, the present invention provides a method of making the reactive media including heating a reactive media starting material mixture to at least partially vitrify the reactive media starting material mixture and provide the reactive media.

In various embodiments, the present invention provides a method of making the reactive media. The method includes heating a reactive media starting material mixture including a mole % Si in Ca of about 83% to about 90% to temperature that does not exceed about 1,070° C., to at least partially vitrify the reactive media starting material and provide the reactive media.

In various embodiments, the present invention provides a method of making the reactive media. The method includes heating a reactive media starting material mixture including a non-clumping clay, dolomitic limestone, CaO, and peat, to at least partially vitrify the reactive media starting material and provide the reactive media.

In various embodiments, the present invention provides a method of making the reactive media. The method includes a reactive media starting material mixture to at least partially vitrify the reactive media starting material and provide the reactive media. About 50 wt % to about 80 wt % of the reactive media starting material mixture is a non-clumping clay. About 5 wt % to about 20 wt % of the reactive media starting material mixture is dolomitic limestone, such that about 0.1 wt % to about 5 wt % of the reactive media starting material is magnesium. About 0.1 wt % to about 10 wt % of the reactive media starting material mixture is $CaCO_3$. About 0.01 wt % to about 5 wt % of the reactive media starting material mixture is CaO. About 1 wt % to about 20 wt % of the reactive media starting material mixture is peat. About 0 wt % to about 30 wt % of the reactive media starting material mixture is water.

In various embodiments, the present invention provides a method of making the reactive media. The method includes heating a reactive media starting material mixture to at least partially vitrify the reactive media starting material and provide the reactive media. About 50 wt % to about 80 wt % of the reactive media starting material mixture is a non-clumping clay. About 1 wt % to about 30 wt % of the reactive media starting material mixture is dolomite. About 0.1 wt % to about 10 wt % of the reactive media starting material mixture is $CaCO_3$. About 0.01 wt % to about 5 wt % of the reactive media starting material mixture is CaO. About 1 wt % to about 20 wt % of the reactive media starting material mixture is peat. About 0 wt % to about 30 wt % of the reactive media starting material mixture is water.

In various embodiments, the reactive media of the present invention and methods of making and using the same have advantages over other sorbents, at least some of which are unexpected. For example, in some embodiments, the reactive media can be easier and less expensive to manufacture than other reactive media. In various embodiments, the reactive media can be more environmentally-friendly than other media, facilitating disposal or subsequent use of the reactive media. In some embodiments, when used for carbonate sorbtion, the reactive media of the present invention can be regenerated.

In various embodiments, the reactive media can provide a larger amount of reactive calcium per mass of the reactive media as compared to other media, such as compared to any similar media, or such as compared to similar media of similar or lesser cost. Some reactive media must be prepared in specialized high-temperature kilns that require extra expense. However, in some embodiments, the reactive media used in the present method can be formed from a composition having a mole % Si in Ca that is closer to a eutectic composition between these two materials (e.g., having a local or global minimum melting point on an Si—Ca binary phase diagram or another phase diagram corresponding to the reactive media starting material) than other reactive media that provide reactive calcium, allowing the use of a lower vitrification temperature that is more conveniently achieved in low-cost conventional kilns, thereby providing a given concentration of reactive calcium at a lower cost than other reactive media.

The reactive media can be particularly well-suited for efficient absorption of oxidized phosphorus (e.g., phosphate) from water. In various embodiments, the reactive media can capture a larger amount of phosphorus per atom of calcium in the reactive media than other reactive medias. The reactive media can capture all or a portion of the phosphorus in the form of tricalcium phosphate, having a calcium to phosphorus ratio of 1.5:1, instead of other types of calcium phosphates with higher calcium to phosphorus ratios, such as hydroxyapatite, having a calcium to phosphorus ratio of 1.7:1. By avoiding production of hydroxyapatite, a material that can rapidly clog flow pathways, various embodiments maintain permeability of the reactive media for longer time and provide for removal of a given amount of phosphorus using a smaller amount of the reactive media.

In various embodiments, the reactive media of the present invention can be less dense and have greater porosity than other media, which can allow water to penetrate the media more efficiently and to contact a greater proportion of the reactive calcium than other reactive media, such that a smaller amount of media removes the same amount of an oxidized material as compared to other media. In various embodiments, the lower density and higher porosity of the media allows for higher flow rates and more efficient removal of the oxidized material.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, "sorbent" means absorbent, adsorbent, or a combination thereof. As used herein, "sorption" means absorption, adsorption, or a combination thereof.

Reactive media.

Various embodiments provide a reactive media. The reactive media includes a ceramic. The reactive media also includes reactive calcium that is available to form a solid calcium salt with an anionic material.

The reactive media can include or can be a ceramic (e.g., at least partially vitrified reactive media starting material) that includes a salt or inorganic compound that provides the reactive calcium. The salt or inorganic compound that includes the reactive calcium is located in the ceramic such that it is available to contact water and react to form the solid calcium salt. For example, the ceramic can include an approximately homogeneous distribution of the reactive calcium. The reactive calcium can occupy intersticies in the ceramic matrix. The ceramic can have any suitable porosity, such that water can flow through the media to a desired degree to contact the reactive calcium therein. The ceramic can have any suitable porosity, such as about 0.01 to about 0.9 (i.e., 1% to 90% void space), or about 0.1 to about 0.5, or about 0.01 or less, or greater than 0.05, 0.1, 0.15, 0.2, 0.25, 0.3, 0.35, 0.4, 0.45, 0.5, 0.55, 0.6, 0.7, 0.8, or about 0.9 or more. The porosity can be measured by the amount of vacuum that can be generated when a single pellet is placed in a tube having an inside diameter that fits tight around the outside diameter of the pellet, and applying a 2.5 ft$^3$/min (4.25 M$^3$/h) vacuum pump to the other end of the tube; such a technique as performed on various embodiments of the reactive media can give a vacuum of about 3 cm Hg to about 40 cm Hg, or about 20 cm Hg to about 25 cm Hg, or about 3 cm Hg or less, or less than, equal to, or greater than about 3 cm Hg, 4, 5, 6, 8, 10, 12, 14, 16, 18, 19, 20, 21, 22, 23, 24, 25, 26, 27, 28, 30, 32, 34, 36, 38 cm Hg, or about 40 cm Hg or more.

The ceramic can be any suitable proportion of the reactive media, such as about 0.01 wt % to about 100 wt %, about 50 wt % to about 99 wt %, about 80 wt % to about 99 wt %, or about 0.01 wt % or less, or less than, equal to, or greater than about 0.1 wt %, 1, 2, 4, 5, 10, 15, 20, 25, 30, 35, 40, 45, 50, 55, 60, 65, 70, 75, 80, 81, 82, 83, 84, 85, 86, 87, 88, 89, 90, 91, 92, 93, 94, 95, 96, 97, 98, 99, 99.9 wt %, or about 99.99 wt % or more. The reactive media can be mainly ceramic; for example, the ceramic can be about 50 wt % to about 100 wt % of the reactive media, about 80 wt % to about 99 wt %, or about 50 wt % or less, or less than, equal to, or greater than about 55 wt %, 60, 65, 70, 75, 80, 82, 84, 86, 88, 90, 92, 94, 96, 98, 99, 99.9 wt %, or about 99.99 wt % or more. The ceramic can be any suitable ceramic, such as a ceramic including a calcium silicate, an iron silicate, an aluminum silicate, an other silicate (e.g., aluminum silicates, potassium silicates, sodium silicates, and others), or a combination thereof. The ceramic can include one or more calcium silicates, and the one or more calcium silicates can be any suitable proportion of the reactive media, such as about 0.01 wt % to about 99 wt %, or about 0.1 wt % to about 80 wt %, or about 1 wt % to about 10 wt %, or about 1 wt % to about 5 wt %, about 2 wt % to about 4 wt %, or about 0.01 wt % or less, or less than, equal to, or greater than about 0.05 wt %, 0.1, 0.5, 1, 2, 3, 4, 5, 6, 7, 8, 9, 10, 15, 20, 25, 30, 40, 50, 60, 70, 80, 90, or about 95 wt % or more of the reactive media.

The reactive media includes reactive calcium that is available to form a solid calcium salt with the anionic material. The reactive calcium can be in the form of a calcium material including one or more salts or inorganic compounds that include calcium and react to provide calcium for formation of the salt, such as $CaO$, $Ca(OH)_2$, or a combination thereof. The one or more calcium-containing salts or inorganic compounds including the reactive calcium can be any suitable proportion of the reactive media, such as about 0.01 wt % to about 100 wt %, about 5 wt % to about 50 wt %, about 15 wt % to about 25 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more. The reactive calcium can be substantially in the form of $CaO$ when dry, such that upon contact with water the $CaO$ transforms to $Ca(OH)_2$ and dissolves into the water.

The concentration of the reactive calcium in the reactive media can be reported in the form of a compound or salt of the reactive calcium that the reactive calcium may or may not actually be in the form of in the reactive media. For example, by immersion of the reactive media in water with agitation for an extended period, the amount of calcium ions that dissolve in the water and become available to form calcium salts can be measured, and can be reported as the concentration of reactive calcium in the reactive media in the form of $CaO$, as if 100% of the reactive calcium were in the form of $CaO$ in the reactive media, but wherein substantially none of, some of, a majority of, or substantially all of the reactive calcium is actually in the form of $CaO$ in the reactive media prior to contacting with the water. The reactive media can have a concentration of reactive calcium as $CaO$, wherein the reactive calcium can be in the form of any water-soluble salt or inorganic compound including the reactive calcium, of about 0.01 wt % to about 100 wt %, about 5 wt % to about 50 wt %, about 10 wt % to about 25 wt %, about 13 wt % to about 23 wt %, about 14 wt % to about 18 wt %, about 18 wt % to about 22 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more. The reactive media can have an actual concentration of $CaO$ that is the same or different, such as about 0.01 wt % to about 100 wt %, about 5 wt % to about 50 wt %, about 10 wt % to about 25 wt %, about 13 wt % to about 23 wt %, about 14 wt % to about 18 wt %, about 18 wt % to about 22 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more.

Any suitable proportion of the reactive media can be calcium, such as in the form of a salt or an inorganic compound, such as reactive calcium that is included in the calcium material and calcium that is included in any calcium silicates in the reactive media, such as about 0.01 wt % to about 100 wt % of the reactive media, about 1 wt % to about 40 wt %, about 5 wt % to about 30 wt %, about 10 wt % to about 20 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more.

The calcium material in the reactive media, such as $CaO$ or $Ca(OH)_2$, can react with the anionic material to form the solid calcium salt. The anionic material can be any suitable anionic material that can form a solid calcium salt with the reactive calcium. The anionic material can be dissolved in water that is flowed around and through the reactive media such that the anionic material comes into contact with the reactive calcium and forms the solid calcium salt. The anionic material can be an anionic impurity in the water that is desired to be removed. The anionic material can be a carbonate anion that forms calcium carbonate with the reactive calcium, a phosphate anion that forms a calcium phosphate with the reactive calcium, or a combination thereof. The solid calcium salt formed from the reactive calcium and the anionic material can be formed at any suitable location, such as within the reactive media, on the exterior of the reactive media, as solid particles captured by a filter bed that can include reactive media and other particles, as solid particles entrained in water passing through the reactive media, as solid particles that exit the reactive media and are captured by a post-reactive media filtration, or a combination thereof.

The calcium material including the reactive calcium can react with the anionic material to form the solid calcium salt at any suitable pH, such as a pH of about 1 to about 14, or about 1 or less, or less than, equal to, or greater than about 2, 3, 4, 5, 6, 7, 8, 9, 10, 11, 12, 13, or about 14 or more. The calcium material including the reactive calcium can react with the anionic material to form the solid calcium salt at a basic pH, which can decrease solubility of certain types of calcium salts formed, such as calcium phosphate salts, such as at a pH of about 9 to about 14, about 9 to about 13, about 9 to about 12, about 10 to about 12, about 10.5 to about 12, about 11.25 to about 11.75, or about 9 or less, or less than, equal to, or greater than about 9.5, 10, 10.1, 10.2, 10.3, 10.4, 10.5, 10.6, 10.7, 10.8, 10.9, 11, 11.05, 11.1, 11.15, 11.2, 11.25, 11.3, 11.35, 11.4, 11.45, 11.5, 11.55, 11.6, 11.65, 11.7, 11.75, 11.8, 11.85, 11.9, 11.95, 12, 12.1, 12.2, 12.3, 12.4, 12.5, 13, 13.5, or about 14 or more.

In some embodiments, the anionic material is an oxidized form of phosphorus, such as phosphate, and the solid calcium salt is a calcium phosphate salt. The solid calcium phosphate salt can be any suitable calcium phosphate salt, such as monocalcium phosphate ($Ca(H_2PO_4)_2$), dicalcium phosphate ($CaHPO_4$), tricalcium phosphate ($Ca_3(PO_4)_2$), amorphous calcium phosphate, dicalcium diphosphate ($Ca_2P_2O_7$), calcium triphosphate ($Ca_5(P_3O_{10})_2$), hydroxyapatite ($Ca_5(PO_4)_3(OH)$), apatite ($Ca_{10}(PO_4)_6(OH, F, Cl, Br)_2$), tetracalcium phosphate ($Ca_4(PO_4)_2O$), a hydrate thereof, or a combination thereof. The solid calcium phosphate salt can include tricalcium phosphate ($Ca_3(PO_4)_2$), which can be formed predominately or in increased proportions to other calcium phosphates due to an elevated pH of the water including the oxidized phosphorus at the time of contacting with the reactive media. Tricalcium phosphate can be any suitable proportion of the overall amount of solid phosphate salt formed during the method, such as about 0 wt % to about 100 wt %, about 50 wt % to about 100 wt %, or less than, equal to, or equal to about 1 wt % or less, or less than, equal to, or greater than about 5 wt %, 10, 15, 20, 25, 30, 35, 40, 45, 50, 55, 60, 65, 70, 75, 80, 85, 90, 95, 96, 97, 98, 99, 99.9 wt %, or about 99.99 wt % or more. For example, the total proportion of the solid calcium salt that is hydroxyapatite can be about 0 wt % to about 80 wt %, or about 0 wt % to about 50 wt %, or about 0 wt % to about 20 wt %, or about 1 wt % or less, or less than, equal to, or greater than about 2 wt %, 3, 4, 5, 10, 15, 20, 25, 30, 35, 40, 45, 50, 55, 60, 65, 70, 75, 80, 85, 90, or about 95 wt % or more. The species of calcium salt formed with the oxidized phosphorus can depend at least to some extent on the concentration of calcium in the water including the oxidized phosphorus, on the pH of the water including the oxidized phosphorus at the time of contacting with the reactive media, and on the magnesium content of the reactive media; the method can include controlling one or more of these factors such that the production of calcium phosphate salts other than tricalcium phosphate is reduced or eliminated, or such that the production of hydroxyapatite is reduced or eliminated.

The reactive media can include magnesium, such as in the form of an inorganic compound or a salt that includes the magnesium, such as in the form of magnesium oxide, magnesium carbonate, or a combination thereof. For example, during heat treatment of a reactive media starting material including dolomitic limestone (e.g., $CaMg(CO_3)_2$ and $CaCO_3$), the $CaMg(CO_3)_2$ and the $CaCO_3$ can be converted into CaO and MgO. In some embodiments, the magnesium can have an effect on the type of solid calcium salt formed in the reactive media. For example, when used to remove a species of oxidized phosphorus from water such as phosphate, the magnesium can decrease the amount of less desirable calcium phosphate salts formed (e.g., calcium phosphate salts having a lower ratio of calcium atoms to phosphorus atoms, such as hydroxyapatite), thereby increasing the amount of more desirable calcium phosphate salts formed such as tricalcium phosphate. The magnesium in the reactive media can stabilize tricalcium phosphate and can disrupt and hinder formation of other forms of calcium phosphate such as hydroxyapatite. The magnesium can be any suitable proportion of the reactive media, such as about 0 wt % to about 30 wt %, about 0.01 wt % to about 30 wt %, about 0.1 wt % to about 20 wt %, about 0.1 wt % to about 5 wt %, about 1 wt % to about 2 wt %, or about 0.01 wt % or less, or less than, equal to, or greater than about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 6, 8, 10, 15, 20, 25 wt %, or about 30 wt % or more. The salt or inorganic compound that includes the magnesium (e.g., MgO, $MgCO_3$, or a combination thereof) can be any suitable proportion of the reactive media, such as about 0.01 wt % to about 90 wt %, or about 0.1 to about 60 wt %, or about 0.1 to about 15 wt %, or about 1 to about 7 wt %, or about 0.01 wt % or less, or less than, equal to, or greater than about 0.1 wt %, 1, 2, 3, 4, 5, 6, 7, 8, 9, 10, 12, 14, 16, 18, 20, 25, 30, 35, 40, 45, 50, 55, 60, 65, 70, 75, 80, 85 wt %, or about 90 wt % or more.

The reactive media can have any suitable mole % Si in Ca, such as about 1% to about 99%, about 60% to about 90%, about 70% to about 90%, or about 80% to about 90%, or about 83% to about 90%, or about 1% or less, or less than, equal to, or greater than about 5%, 10, 15, 20, 25, 30, 35, 40, 45, 50, 55, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98%, or about 99 mol % or more.

The reactive media can have any suitable total capacity for forming or capturing the solid calcium salt. For example, the reactive media can have a capacity for forming a solid phosphate salt or a solid carbonate salt of about 0.001 g to about 1 g of phosphorus or carbon per gram of reactive media prior to contacting with the water including the oxidized phosphorus or carbonate, or about 0.01 g to about 0.5 g, or about 0.01 g to about 0.2 g, or about 0.14 g to about 0.16 g, or about 0.001 g or less, or less than, equal to, or greater than about 0.005 g, 0.01, 0.02, 0.022, 0.024, 0.026, 0.028, 0.029, 0.03, 0.031, 0.032, 0.033, 0.034, 0.035, 0.036, 0.037, 0.038, 0.039, 0.04, 0.045, 0.05, 0.055, 0.06, 0.08, 0.09, 0.10, 0.11, 0.12, 0.13, 0.14, 0.15, 0.16, 0.17, 0.18, 0.20, 0.22, 0.24, 0.3, 0.4, 0.5, 0.6, 0.7, 0.8, 0.9 g, or about 1 g or more. The reactive media can capture about 0.001 g to about 1 g of phosphorus or carbon per $cm^3$ of reactive media prior to contacting with the water including the oxidized phosphorus or carbonate, about 0.01 g to about 0.5 g, or about 0.01 g to about 0.2 g, or about 0.01 g to about 0.14 g, or about 0.001 g or less, or less than, equal to, or greater than about 0.005 g, 0.01, 0.02, 0.04, 0.06, 0.08, 0.09, 0.10, 0.11, 0.12, 0.13, 0.14, 0.15, 0.16, 0.17, 0.18, 0.20, 0.22, 0.24, 0.3, 0.5, 0.6, 0.7, 0.8, 0.9 g, or about 1 g or more. The capacity of the reactive media for forming or capturing the solid calcium salt can depend on the concentration of reactive calcium (e.g., calcium available to form a solid calcium salt with the anionic material) in the water including the anionic material. A higher concentration of reactive calcium in the water prior to contacting with the reactive media can increase the capacity of the reactive media. The flow rate through the media can be any suitable flow rate, such as about 10 GPM (37.9 LPM) per square foot of media (0.28 $m^3$) or less, or about 100 GPM or less, or about 0.001 GPM to about 100 GPM, or about 0.01 GPM to about 10 GPM, or less than, equal to, or greater than about 0.001 GPM, 0.01, 0.1, 1, 2, 3, 4, 5, 6, 7, 8, 9, 10, 25, 50, 75, or about 100 GPM per square foot of media or more.

The reactive media can have any suitable moisture content, prior to contacting with the water including the anionic material, such as about 0 wt % to about 20 wt %, or about 0 wt % to about 10 wt %, about 0.001 wt % to about 5 wt %, or about 0.001 wt % or less, or less than, equal to, or greater than about 0.01 wt %, 0.1, 1, 2, 3, 4, 5, 6, 7, 8, 9, 10, 12, 14, 16, 18 wt %, or about 20 wt % or more.

Method of Using the Reactive Media.

Various embodiments of the present invention provide a method of using any embodiment of the reactive media described herein. The method can be any suitable method of contacting an anionic material with the reactive media, such as in water, to form the solid calcium salt including the anionic material. The method can be a method of removing or decreasing the concentration of an anionic material in water. The method can include contacting water including the anionic material with the reactive media to form the solid calcium salt. The contacting can include flowing the water through the media, flowing the water to contact the exterior of the media, or a combination thereof. The anionic material can be oxidized phosphorus such as phosphate and the solid calcium salt formed can be a calcium phosphate salt. The anionic material can be carbonate and the solid calcium salt formed can be calcium carbonate.

The anionic material can be in an aqueous solution that is predominantly water. The solution can include water, water miscible solvents such as ($C_1$-$C_5$)alcohols, or a combination thereof. The solution of the anionic material can have any suitable concentration of calcium. In addition to the calcium provided by the reactive media, the calcium in the solution can also form the solid calcium salt in the media with the anionic material, such as with phosphate. For example, prior to contacting with the reactive media, an aqueous solution including the anionic material can have any suitable calcium content, such as about 0 mg/L to about 10,000 mg/L, about 1 mg/L to about 300 mg/L, about 100 mg/L to about 200 mg/L, or about 125 mg/L to about 175 mg/L, or about 1 mg/L or less, or less than, equal to, or greater than about 2 mg/L, 3, 4, 5, 10, 15, 20, 25, 50, 75, 100, 125, 150, 175, 200, 225, 250, 300, 350, 400, 450, 500, 600, 700, 1,000, 1,500, 2,000, 5,000, 7,500 mg/L, or about 10,000 mg/L or more. The concentration of calcium in the water including the phosphorus can occur naturally, or can be controlled (e.g., increased). The calcium content can be controlled by addition or contacting of the water with as suitable calcium-containing salt, inorganic compound, or organic compound, such as CaO, $Ca(OH)_2$, or a combination thereof.

The contacting of the water with the reactive media can be performed in any suitable way, such that the insoluble calcium salt including the anionic material is formed. The method can include contacting the water including the anionic material and the reactive media in a containment apparatus, such as in one or more suitable containers or other contacting apparatus, such as in a column, tank, filter, or a combination thereof. Contacting the water including the oxidized phosphorus with the reactive media can include flowing the water through a column or bed including the reactive media, such that the reactive media acts as a reactive filter. The solid calcium salt formed from the reactive calcium and the anionic material can be formed at any suitable location, such as within the reactive media, on the exterior of the reactive media, as solid particles captured by a filter bed that can include reactive media and other particles, as solid particles entrained in water passing through the reactive media, as solid particles that exit the reactive media and are captured by a post-reactive media filtration, or a combination thereof.

The method can include contacting water including the anionic material and the reactive media at any suitable pH, such that the solid calcium salt forms. The method can include controlling the pH of the water that contacts the reactive media, such as by adding acid or base thereto, or the pH of the water can have a particular pH naturally without any active pH control. The water including the anionic material can be contacted with the reactive media at any suitable pH, such as a pH of about 1 to about 14, or about 1 or less, or less than, equal to, or greater than about 2, 3, 4, 5, 6, 7, 8, 9, 10, 11, 12, 13, or about 14 or more.

The water including the anionic material can be contacted with the reactive media at a basic pH, which can decrease solubility of certain types of calcium salts formed, such as calcium phosphate salts, such as at a pH of about 9 to about 14, about 9 to about 13, about 9 to about 12, about 10 to about 12, about 10.5 to about 12, about 11.25 to about 11.75, or about 9 or less, or less than, equal to, or greater than about 9.5, 10, 10.1, 10.2, 10.3, 10.4, 10.5, 10.6, 10.7, 10.8, 10.9, 11, 11.05, 11.1, 11.15, 11.2, 11.25, 11.3, 11.35, 11.4, 11.45, 11.5, 11.55, 11.6, 11.65, 11.7, 11.75, 11.8, 11.85, 11.9, 11.95, 12, 12.1, 12.2, 12.3, 12.4, 12.5, 13, 13.5, or about 14 or more. Controlling the pH can include contacting the water including the anionic material (e.g., oxidized phosphorus) during the oxidation, after the oxidation, before contacting with the media, or during contacting with the media, with any one or more suitable bases that can elevate the pH to a desired level, such as with sodium hydroxide, calcium hydroxide, sodium carbonate, sodium bicarbonate, potassium hydroxide, potassium bicarbonate, potassium carbonate, sodium phosphate, disodium hydrogen phosphate, sodium aluminate, sodium borate, sodium acetate, sodium silicate, or a combination thereof. Controlling the pH can include oxidizing aqueous phosphorus using ferrate, such using a basic ferrate solution, which can raise the pH of the water being treated. Ferrate oxidation can be used to control pH alone or in combination with addition of other materials, such with addition of base. Raising of the pH of the water prior to contacting with the reactive media can be performed to an extent such that the pH of the water is elevated but substantially no solid salt including the anionic material forms prior to contacting the water with the reactive media. The reactive media can further elevate the pH of water contacting the same, such as via calcium hydroxide in the reactive media. Elevating the pH of water contacting the reactive media can allow the reactive media to last longer by dissolving calcium hydroxide from the reactive media at a lower rate per given volume of water treated with the reactive media.

The anionic material, such as the phosphorus that is in an oxidized state, can have any suitable concentration in the water, such as have a concentration of about 0.001 ppm to about 10,000 ppm (wherein all ppm herein are ppm by weight unless otherwise indicated), about 0.01 ppm to about 1,000 ppm, about 0.01 to 20 ppm, about 0.05 ppm to about 10 ppm, about 0.05 ppm to about 1 ppm, about 1 ppm to about 10 ppm, or about 0.001 ppm or less, or less than, equal to, or greater than about 0.005 ppm, 0.01, 0.05, 0.1, 0.2, 0.4, 0.6, 0.8, 1, 1.2, 1.4, 1.6, 1.8, 2, 2.5, 3, 3.5, 4, 4.5, 5, 6, 7, 8, 9, 10, 20, 30, 40, 50, 75, 100, 150, 200, 250, 500, 1,000, 2,500, 5,000 ppm, or about 10,000 ppm or more.

After contacting with the reactive media, the water can have any suitable concentration of the anionic material that was removed or diminished in concentration (e.g., oxidized phosphorus or carbonate), such as a concentration of about 0 ppm to about 1 ppm, about 0.0001 ppm to about 1 ppm, 0.0001 ppm to about 0.1 ppm, about 0.001 ppm to about 0.1 ppm, or about 0 ppm to about 0.05 ppm, or about 0 ppm to about 0.005 ppm, or about 0.0001 ppm or less, or less than, equal to, or greater 0.0005 ppm, 0.001, 0.005, 0.01, 0.05, 0.1, 0.5 ppm, or about 1 ppm or more, or less than 0.05 ppm, or less than 0.005 ppm.

The method can include a pre-filtration process that includes filtering the water including the anionic material prior to contacting the water with the reactive media. The pre-filtration can remove particulates, such as organic or inorganic particles. The filtration can be performed using any suitable filter, such as using a bag filter, sand filtration, or filter cartridges. One or more filters can be used, such as filters having successively smaller pore sizes. The filter can have any suitable pore size, or can remove particles larger than any suitable size, such as about 1 micron to about 1,000 microns, or about 5 microns to about 200 microns, or about 10 microns to about 100 microns, or about 1 micron or less, or less than, equal to, or greater than about 2 microns, 3, 4, 5, 10, 15, 20, 25, 30, 40, 50, 75, 100, 150, 200, 250, 500, 750 microns, or about 1,000 microns or more.

The method can include a post-reactive media filtration process that includes filtering the water after contact with the reactive media. The post-reactive media filtration can remove particles such as phosphate- or carbonate-containing particles. Such phosphate- or carbonate-containing particles, if not removed, can dissolve and cause an increase in phosphorus or carbonate concentration in the treated water. The post-reactive media filtration can occur shortly after the contacting with the reactive media, such as prior to any neutralization step, such as while the pH of the water is still sufficiently high to prevent resolubilization of one or more solid calcium salts (e.g., calcium phosphate salts) that are entrained in the water. The post-reactive media filtration can be performed using any suitable filter, such as using a bag filter, sand filtration, or filter cartridges. One or more filters can be used, such as filters having successively smaller pore sizes. The filter can have any suitable pore size, or can remove particles larger than any suitable size, such as about 0.1 micron to about 1,000 microns, about 0.1 microns to about 10 microns, or about 0.5 microns to about 5 microns, or about 0.1 micron or less, or less than, equal to, or greater than about 0.5 microns, 1, 2, 3, 4, 5, 10, 15, 20, 25, 30, 40, 50, 75, 100, 150, 200, 250, 500, 750 microns, or about 1,000 microns or more.

The method can include reducing the pH of the water after contacting with the reactive media to capture the anionic material thereon. Before returning the water having decreased levels of the anionic material to the environment, the pH can be reduced to environmentally-friendly levels. For example, reducing the pH of the water can include reducing the pH of the water to about 6 to about 11, about 6 to about 9, or about 8 to about 9, or about 6 or less, or less than, equal to, or greater than about 6.5, 7, 7.5, 8, 8.5, 9, 9.5, 10, 10.5, or about 11 or more. Neutralizing the water can be performed by contacting the water with an acid (e.g., in a mixing tank), such as a mineral acid, an organic acid, or a combination thereof. Neutralizing the water can be performed by contacting the water with citric acid, hydrochloric acid, acetic acid, sulfuric acid, or a combination thereof. The neutralization can occur after a post-reactive media treatment step designed to remove insoluble calcium salts from the water.

In embodiments of the method including removing carbonate from the water to form calcium carbonate, the reactive media can be heated to a sufficient temperature to transform some or all of the calcium carbonate into CaO, regenerating the reactive media for reuse.

The reactive media can be formed from a reactive media starting material using suitable processing. The reactive media can be ready for use at the onset of the method of reducing the concentration of the anionic material in the water with the reactive media. In other embodiments, the method of contacting the water including the anionic material with the reactive media includes preparing the reactive media.

Method of Making the Reactive Media.

Various embodiments of the present invention provide a method of making reactive media. The reactive media can be any embodiment of a reactive media described herein, or can be any reactive media that can be formed via the method of making the reactive media herein. The reactive media can be formed from the reactive media starting material using suitable processing. In some embodiments, the reactive media starting material mixture includes a non-clumping clay, dolomitic limestone, CaO, and peat.

Forming the reactive media can include drying a wet reactive media starting material to form the reactive media starting material. Forming the reactive media can include extruding the reactive media starting material. Forming the reactive media can include vitrifying the reactive media starting material (e.g., vitrifying the extruded reactive media starting material), to form the reactive media.

A wet reactive media starting material (e.g., any reactive media starting material including water) can have any suitable moisture content, such as about 0.001 wt % to about 50 wt %, or about 10 wt % to about 30 wt %, or about 15 wt % to about 20 wt %, or about 0.001 wt % or less, or less than, equal to, or greater than about 0.01 wt %, 0.1, 1, 2, 3, 4, 5, 6, 8, 10, 12, 14, 16, 18, 20, 22, 24, 26, 28, 30, 35, 40, 45 wt %, or about 50 wt % or more. A wet reactive media can be a slurry, a wet solid, or any combination thereof. Drying the reactive media starting material can be conducted in any suitable way, such as including decanting of liquid, filtration, heating to remove water, placing under reduced pressure, exposing fresh surface area by stirring or breaking up the material, or a combination thereof. Heating the reactive media during a drying process can include heating to any suitable temperature, such as about 30° C. to about 3,000° C., or about 30° C. to about 300° C., or about 30° C. or less, or less than, equal to, or greater than about 40° C., 50, 75, 100, 125, 150, 175, 200, 225, 250, 275, 300, 350, 400, 450, 500, 750, 1,000, 1,500, 2,000, 2,500, or about 3,000° C. or more. The drying can be performed until the reactive media starting material has a moisture content of about 0 wt % to about 50 wt %, or about 10 wt % to about 30 wt %, or about 15 wt % to about 20 wt %, or about 1 wt % or less, or less than, equal to, or greater than about 2, 3, 4, 5, 6, 8, 10, 12, 14, 16, 18, 20, 22, 24, 26, 28, 30, 35, 40, 45 wt %, or about 50 wt % or more. A separate drying step can be omitted, such as when the moisture content of the reactive media starting material is about 0 wt % to about 30 wt %, or about 15 wt % to about 20 wt %, or about 1 wt % or less, or less than, equal to, or greater than about 2, 3, 4, 5, 6, 8, 10, 12, 14, 16, 18, 20, 22, 24, 26, 28 wt %, or about 30 wt % or more. With or without a separate drying step, a vitrification step can cause at least some drying. Addition of CaO to wet clay can cause formation of $Ca(OH)_2$ and dehydration of the clay, with corresponding effects on the texture of the material, such that, in some embodiments, wet clay can be dehydrated to a suitable consistency for extrusion by adding CaO thereto.

Vitrifying the reactive media starting material can include heating to any suitable temperature such that at least some vitrification of the reactive media starting material occurs to form the reactive media, such as to form a ceramic portion of the reactive media. Vitrifying can include heating to a temperature of about 500° C. to about 3000° C., about 900° C. to about 1100° C., or about 500° C. or less, or less than, equal to, or greater than about 600° C., 700, 800, 900, 950, 1,000, 1,050, 1,100, 1,200, 1,300, 1,400, 1,500, 1,600, 2,000, 2,500° C., or about 3,000° C. or more. The temperature can be maintained for a suitable time period such as about 1 s to about 24 h, or about 10 s to about 8 h, or about 10 min to about 30 min, or about 1 s or less, or less than, equal to, or greater than about 10 s, 30 s, 1 min, 5, 10, 15, 20, 30, 40, 50 min, 1 h, 2, 3, 4, 5, 6, 7, 8, 9, 10, 12, 14, 16, 18, 20, 22, or about 24 h or more.

Vitrifying the reactive media starting material to form the reactive media can include forming a calcium silicate ceramic from calcium and silicon in the reactive media starting material. The calcium silicate can include $CaSiO_3$, $Ca_2SiO_4$, $Ca_3SiO_5$, $Ca_3Si_2O_7$, or a combination thereof. Vitrifying the reactive media starting material can include forming a source of reactive calcium in the reactive media, such as a calcium material. For example, CaO can be formed, such as from $Ca(OH)_2$ in the reactive media starting material or from other components. In some embodiments, at least part of the source of reactive element in the reactive media, such as at least part of the calcium material (e.g., $Ca_0$), is in the reactive media starting material and is preserved through the process of forming the reactive media.

Before or during the vitrification or drying, the reactive media starting material or the reaction product thereof can be extruded. The extrusion can be performed with any suitable amount of pressure, such that a desired density of the reactive media is achieved. In some embodiments, the pressure used during the extrusion is low or minimized, such that any increase in density of the resulting extruded reactive media is low or minimized. Prior to or during an extrusion, a suitable amount of water can be added to give the reactive media starting material a texture that is suitable for extrusion, such as to give the reactive media starting material a moisture content of about 10 wt % to about 30 wt %, or about 15 wt % to about 20 wt %, or about 1 wt % or less, or less than, equal to, or greater than about 2, 3, 4, 5, 6, 8, 10, 12, 14, 16, 18, 20, 22, 24, 26, 28 wt %, or about 30 wt % or more. The extruded pieces can have a largest cross-sectional dimension of any suitable size, such as about 1 cm to about 100 cm, 5 cm to about 20 cm, 9 cm to about 13 cm, or about 1 cm or less, or less than, equal to, or greater than about 2 cm, 3, 4, 5, 10, 15, 20, 25, 30, 35, 40, 45, 50, 55, 60, 65, 70, 75, 80, 85, 90, 95 cm, or about 100 cm or more. During or after extrusion, the extruded reactive media can be cut or allowed to break into chunks, such as via approximately cross-sectional cuts or breaks, of any suitable size, such as about 1 cm to about 100 cm, 5 cm to about 20 cm, 9 cm to about 13 cm, or about 1 cm or less, or less than, equal to, or greater than about 2 cm, 3, 4, 5, 10, 15, 20, 25, 30, 35, 40, 45, 50, 55, 60, 65, 70, 75, 80, 85, 90, 95 cm, or about 100 cm or more. During any drying and during the vitrification, the extruded reactive media starting material can shrink slightly, such as about 0.01% to about 30%, about 1% to about 20%, or about 5% to about 15%, in each dimension.

After vitrification, the finished reactive media can have any suitable moisture content, prior to contacting with the water including the anionic material, such as about 0 wt % to about 20 wt %, or about 0 wt % to about 10 wt %, about 0.001 wt % to about 5 wt %, or about 0.001 wt % or less, or less than, equal to, or greater than about 0.01 wt %, 0.1, 1, 2, 3, 4, 5, 6, 7, 8, 9, 10, 12, 14, 16, 18 wt %, or about 20 wt % or more.

The reactive media starting material can include clay, such as one clay or more than one clay. The one or more clays can be any suitable proportion of the reactive media starting material, such as about 0 wt % to about 99 wt %, about 1 wt % to about 99 wt %, about 50 wt % to about 90 wt %, or about 50 wt % to about 80 wt %, or about 55 wt % to about 70 wt %, or about 1 wt % or less, or less than, equal to, or greater than about 2 wt %, 3, 4, 5, 10, 15, 20, 25, 30, 35, 40, 45, 50, 52,54,56, 58, 60, 62, 64, 68, 70, 72, 74, 76, 78, 80, 82, 84, 86, 88, 90, 92, 94, 96, 98, 99, 99.9 wt %, or about 99.99 wt % or more. The clay can include calcium silicates, iron silicates, aluminum silicates, or a combination thereof. The clay can include kaolinite, illite, gibbsite, silt, silica, aluminum oxide, or a combination thereof. The clay can be a non-clumping clay, such as a non-bentonite clay. The clay can have any suitable amount of silica. For example, the clay can be about 10 wt % to about 90 wt % silica, or about 35 wt % to about 85 wt %, about 55 wt % to about 65 wt %, about 58 wt % to about 64 wt %, or about 10 wt % or less, or less than, equal to, or greater than about 15 wt %, 20, 25, 30, 35, 40, 45, 50, 55, 60, 65, 70, 75, 80, 85 wt %, or about 90 wt % or more. Alumina ($Al_2O_3$) can be about 1 wt % to about 50 wt % of the clay, about 10 wt % to about 30 wt %, about 15 wt % to about 20 wt %, or about 1 wt % or less, or less than, equal to, or greater than about 5 wt %, 10, 15, 20, 25, 30, 35, 40, 45 wt %, or about 50 wt % or more. Iron oxide ($Fe_2O_3$) can be about 0 wt % to about 50 wt % of the clay, about 1 wt % to about 20 wt %, about 5 wt % to about 10 wt %, or about 1 wt % or less, or less than, equal to, or greater than about 2 wt %, 3, 4, 5, 6, 7, 8, 9, 10, 15, 20, 25 wt %, or about 30 wt % or more. Calcium oxide (CaO) can be about 0 wt % to about 30 wt % of the clay, about 0.1 wt % to about 5 wt %, about 0.5 wt % to about 1 wt %, or about 0.1 wt % or less, or less than, equal to, or greater than about 0.2 wt %, 0.4, 0.6, 0.8, 1, 1.2, 1.4, 1.6, 1.8, 2, 2.5, 3, 4, 5, 6, 8, 10, 15, 20, 25 wt %, or about 30 wt % or more. Magnesium oxide (MgO) can be about 0 wt % to about 30 wt % of the clay, about 0.1 wt % to about 10 wt %, about 1 wt % to 3 wt % or about 0.1 wt % or less, or less than, equal to, or greater than about 0.2 wt %, 0.4, 0.6, 0.8, 1, 1.2, 1.4, 1.6, 1.8, 2. 2.2, 2.4, 2.6, 2.8, 3, 3.5, 4, 4.5, 5, 6, 7, 8, 9, 10, 12, 14, 16, 18, 20, 25 wt %, or about 30 wt % or more.

The reactive media starting material can include a calcium source. The calcium source can be any suitable proportion of the reactive media starting material, such as about 0.01 wt % to about 99 wt %, about 1 wt % to about 50 wt %, about 5 wt % to about 20 wt %, about 10 wt % to about 15 wt %, or about 0.01 wt % or less, or less than, equal to, or greater than about 0.1 wt %, 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 96, 97, 98 wt %, or about 99 wt % or more. The calcium source can be any material that includes calcium and that forms the reactive media. The calcium source can be a calcium silicate (e.g., $CaSiO_3$, $Ca_2SiO_4$, $Ca_3SiO_5$, $Ca_3Si_2O_7$, or a combination thereof), CaO, $Ca(OH)_2$, $CaCO_3$, limestone, dolomitic limestone, or a combination thereof. The calcium source can transform into a ceramic in the reactive media, into the calcium material in the reactive media that reacts with the anionic material to form the solid calcium salt, or a combination thereof. The calcium source can be or can include calcium carbonate ($CaCO_3$). The calcium source can be or include limestone. The calcium source can be or include dolomitic limestone (e.g., $CaMg(CO_3)_2$ and $CaCO_3$). The calcium source can be or can include calcium carbonate and calcium oxide, such as dolomitic limestone and calcium oxide, such as wherein the calcium source is about 10 wt % to about 90 wt % dolomitic limestone and about 90 wt % to about 10 wt % calcium oxide. Any suitable proportion of the reactive media starting material can be calcium, such as about 0.01 wt % to about 100 wt %, about 1 wt % to about 40 wt %, about 1 wt % to about 30 wt %, about 1 wt % to about 20 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more.

The calcium source in the reactive media starting material can provide any suitable amount of reactive calcium as CaO, wherein the reactive calcium can be in the form of any water-soluble salt or inorganic compound including the reactive calcium, such as about 0.01 wt % to about 100 wt % reactive calcium as CaO in the reactive starting material, about 5 wt % to about 50 wt %, about 15 wt % to about 25 wt %, about 18 wt % to about 22 wt %, or about 0.01 wt % or less, or less than, equal to, or greater than about 0.05 wt %, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 28, 30, 32, 34, 36, 38, 40, 45, 50, 55, 60, 65, 70, 75, 80, 85, 90, 95, 96, 97, 98, 99, 99.9 wt %, or about 99.99 wt % or more. The amount of reactive calcium as CaO in the reactive media starting material can be the same or different as the amount of reactive calcium as CaO in the reactive media. The vitrification of the reactive media starting material can cause some of the salt or inorganic compound including the reactive calcium in the reactive media starting material to transform into calcium silicates having calcium that is not available for dissolution or reaction with anionic material during contacting with water. Any suitable proportion of the reactive calcium as CaO in the reactive media starting material can be retained as reactive calcium as CaO in the reactive media, such as about 1 wt % to about 100 wt %, about 80 wt % to about 95 wt %, or about 1 wt % or less, or less than, equal to, or greater than about 5 wt %, 10, 15, 20, 25, 30, 35, 40, 45, 50, 55, 60, 65, 70, 75, 80, 81, 82, 83, 84, 85, 86, 87, 88, 89, 90, 91, 92, 93, 94, 95, 96, 97, 98, 99, 99.9 wt %, or about 99.99 wt % or more. Any suitable proportion of the reactive calcium as CaO in the reactive media starting material can be transformed into calcium silicates in the reactive media or otherwise lost during the vitrification process to form the reactive media, such as about 1 wt % to about 99 wt %, about 5% to about 20%, or about 1 wt % or less, or less than, equal to, or greater than about 2 wt %, 3, 4, 5, 6, 7, 8, 9, 10, 11, 12, 13, 14, 15, 16, 17, 18, 20, 22, 24, 26, 28, 30, 35, 40, 45, 50, 55, 60, 65, 70, 75, 80, 85, 90 wt % or about 95 wt % or more.

Any suitable proportion of the reactive media starting material can be CaO, such as about 0 wt % to about 100 wt %, or about 0.1 wt % to about 50 wt %, or about 0.1 wt % to about 10 wt %, or about 0.01 wt % or less, or less than, equal to, or greater than about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.5, 4, 4.5, 5, 6, 7, 8, 9, 10, 12, 14, 16, 18, 20, 25, 30, 35, 40, 45, 50, 55, 60, 65, 70, 75, 80, 85, 90 wt %, or about 95 wt % or more.

Any suitable proportion of the reactive media starting material can be $CaCO_3$, such as about 0 wt % to about 100 wt %, 0.01 wt % to about 100 wt %, or about 0.1 wt % to about 20 wt %, or about 1 wt % to about 5 wt %, or about 2 wt % to about 5 wt %, or about 0.01 wt % or less, or less than, equal to, or greater than about 0.1 wt %, 0.5, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 4, 4.5, 5, 6, 7, 8, 9, 10, 15, 20, 25, 30, 35, 40, 45, 50, 55, 60, 65, 70, 75, 80, 85, 90, 95, or about 99 wt % or more.

The reactive media starting material can include a magnesium source. The magnesium source can by any suitable proportion of the reactive media starting material, such as about 0 wt % to about 99 wt %, about 0.01 wt % to about 99 wt %, about 1 wt % to about 50 wt %, about 5 wt % to about 20 wt %, about 0.1 wt % to about 15 wt %, or about 0.01 wt % or less, or less than, equal to, or greater than about 0.1 wt %, 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 96, 97, 98 wt %, or about 99 wt % or more. The magnesium source can be dolomitic limestone, dolomite ($CaMg(CO_3)_2$), magnesium oxide, magnesium carbonate, fly ash, cement kiln dust, an industrial byproduct including Mg, or a combination thereof. In some embodiments, the magnesium source is dolomitic limestone. The magnesium source and the calcium source can be the same material (e.g., dolomitic limestone). Magnesium can be any suitable proportion of the reactive media starting material, such as about 0 wt % to about 30 wt %, about 0.01 wt % to about 30 wt %, about 0.1 wt % to about 20 wt %, about 0.1 wt % to about 5 wt %, about 1 wt % to about 2 wt %, or about 0.01 wt % or less, or less than, equal to, or greater than about 0.1 wt %, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.5, 4, 4.5, 5, 6, 8, 10, 15, 20, 25 wt %, or about 30 wt % or more.

Any suitable proportion of the reactive media starting material can be dolomite ($CaMg(CO_3)_2$), such as about 0 wt % to about 100 wt %, about 0.01 wt % to about 100 wt %, 1 wt % to about 30 wt %, 5 wt % to about 10 wt %, or about 0.01 wt % or less, or less than, equal to, or greater than about 0.1 wt %, 1, 2, 3, 4, 5, 6, 7, 8, 9, 10, 11, 12, 13, 14, 15, 16, 17, 18, 19, 20, 22, 24, 26, 28, 30, 32, 34, 36, 38, 40, 45, 50, 55, 60, 65, 70, 75, 80, 85, 90, 95, 96, 97, 98 wt %, or about 99 wt % or more.

Any suitable proportion of the reactive media starting material can be dolomitic limestone ($CaCO_3$ and $CaMg(CO_3)_2$), such as about 0 wt % to about 99 wt %, about 0.01 wt % to about 99 wt %, about 1 wt % to about 50 wt %, about 5 wt % to about 20 wt %, about 5 wt % to about 15 wt %, or about 0.01 wt % or less, or less than, equal to, or greater than about 0.1 wt %, 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 85, 90, 95, 96, 97, 98 wt %, or about 99 wt % or more. Any suitable proportion of the dolomitic limestone can be dolomite, such as about 1 wt % to about 99 wt %, or about 60 wt % to about 80 wt %, or about 1 wt % or less, or less than, equal to, or greater than about 2, 3, 4, 5, 10, 15, 20, 25, 30, 35, 40, 45, 50, 55, 60, 62, 64, 66, 68, 70, 72, 74, 76, 78, 80, 85, 90, 95, 96, 97, 98 wt %, or about 99 wt % or more. Any suitable proportion of the dolomitic limestone can be magnesium, such as about 0.1 wt % to about 60 wt %, about 1 wt % to about 30 wt %, about 5 wt % to about 15 wt %, or about 0.1 wt % or less, or less than, equal to, or greater than about 1 wt %, 2, 3, 4, 5, 6, 7, 8, 9, 10, 11, 12, 13, 14, 15, 16, 17, 18, 19, 20, 25, 30, 35, 40, 45, 50, 55 wt %, or about 60 wt % or more.

The reactive media starting material can include an organic material. The organic material can be any suitable proportion of the reactive media, such as about 0 wt % to about 50 wt %, about 0.01 wt % to about 50 wt %, or about 1 wt % to about 20 wt %, about 1 wt % to about 10 wt %, or about 1 wt % or less, or less than, equal to, or greater than about 2 wt %, 3, 4, 5, 6, 7, 8, 9, 10, 11, 12, 13, 14, 15, 16, 17, 18, 19, 20, 22, 24, 26, 28, 30, 35, 40, 45 wt % or about 50 wt % or more of the reactive media starting material. The organic material can be or can include saw dust, wood residue, cellulose fiber (e.g., a byproduct of manufacturing paper products), lake bottom sludge, peat (e.g., Canadian peat, Canadian peat fines, dust residue from Canadian peat processing, or a combination thereof), organic agricultural residue (e.g., corn cobs, corn, rice hulls, coconut shells, and the like), or a combination thereof.

The reactive media starting material can include a clay source, a calcium source, a magnesium source, and an organic material. The calcium source and the magnesium source can be the same. In some embodiments, the reactive media starting material includes a non-clumping clay, CaO (e.g., as CaO, or as a hydrated form such as $Ca(OH)_2$), dolomitic limestone, and peat.

The reactive media starting material can have a composition such that vitrification can occur at a lower temperature then other similar reactive media starting material compositions. In some embodiments, the lower vitrification temperature is at least in part due to the reactive starting material having a concentration of calcium (Ca) and silicon (Si) such that the mole % Si in Ca is closer to a eutectic mole % Si in Ca (e.g., on a Ca—Si binary phase diagram, or on another phase diagram corresponding to the reactive media starting material composition) having a local or global minimum melting point temperature compared to similar compositions having different mole % of Si in Ca. Forming the reactive media from the reactive media starting material can include controlling the mole % Si in Ca during formation of the reactive media (e.g., by appropriately choosing the composition of the reactive media starting material) to be about 1% to about 99%, about 60% to about 90%, about 70% to about 90%, or about 1% or less, or less than, equal to, or greater than about 5%, 10, 15, 20, 25, 30, 35, 40, 45, 50, 55, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98%, or about 99 mol % or more. The mole % Si in Ca can be such that the melting point of the reactive media starting material is within about 0° C. to about 300° C. of a eutectic point melting temperature of a phase diagram corresponding to the reactive media starting material, or about 0° C. to about 200° C., about 0° C. to about 100° C., about 0° C. to about 50° C., about 0° C. to about 10° C., about 0° C. to about 5° C., or about 1° C. or less, or about 2, 3, 4, 5, 6, 7, 8, 9, 10, 12, 14, 16, 18, 20, 25, 30, 35, 40, 50, 60, 70, 80, 90, 100, 110, 120, 130, 140, 150, 160, 170, 180, 190, 200, 205, 210, 215, 220, 225, 230, 235, 240, 245, 250, 255, 260, 265, 270, 275, 280, 285, 290, 295° C., or within about 300° C. or more. In some embodiments, the temperature used during formation of the reactive media from the reactive media starting material (e.g., the temperature required for at least partial vitrification of the reactive media starting material) does not exceed about 1,100° C., or about 1,070° C., or about 1,062° C., or about 1,065, 1,070, 1,080, 1,090, 1,100, 1,150, 1,200, 1,250, 1,300, 1,400, 1,500, 1,600, 1,700, 1,800, 1,900, 2,000° C., or about 2,100° C. or more.

In various embodiments, a reactive media starting material can be about 50 wt % to about 80 wt % non-clumping clay, about 5 wt % to about 20 wt % dolomitic limestone (such that about 0.1 wt % to about 5 wt % of the reactive media starting material is magnesium), about 0.1 wt % to about 10 wt % $CaCO_3$, about 0.01 wt % to about 5 wt % CaO, about 1 wt % to about 20 wt % peat, and about 0 wt % to about 30 wt % water.

In various embodiments, the reactive media starting material can be about 50 wt % to about 80 wt % non-clumping clay, about 1 wt % to about 30 wt % dolomite, about 0.1 wt % to about 10 wt % $CaCO_3$, about 0.01 wt % to about 5 wt % CaO, about 1 wt % to about 20 wt % peat, and about 0 wt % to about 30 wt % water.

EXAMPLES

Various embodiments of the present invention can be better understood by reference to the following Examples which are offered by way of illustration. The present invention is not limited to the Examples given herein.

The red clay used in the Examples was obtained from a Brick manufacturer in Iowa, and had the analysis shown in Table 1.

TABLE 1

Red clay analysis.

| MATERIAL | DRY WEIGHT % | FIRED WEIGHT % |
|---|---|---|
| Loss on ignition (1050° C.) | 6.5 | |
| Silica ($SiO_2$) | 59.6 | 63.7 |
| Alumina ($Al_2O_3$) | 17.7 | 18.9 |
| Iron Oxide ($Fe_2O_3$) | 8.6 | 9.2 |
| Titanium Oxide ($TiO_2$) | 1.0 | 1.1 |
| Calcium Oxide (CaO) | 0.78 | 0.81 |
| Magnesium Oxide (MgO) | 1.9 | 2.0 |
| Potassium Oxide ($K_2O$) | 3.2 | 3.5 |
| Sodium Oxide ($Na_2O$) | 0.65 | 0.70 |
| Manganese Oxide (MnO) | 0.11 | 0.12 |
| Phosphate ($P_2O_5$) | <0.25 | <0.25 |

Comparative Example A. Reactive Media

As an example of a commercially available reactive media, Table 2 illustrates the average chemical composition of comparative media A, which was Filtralite® P, an expanded clay media produced by Saint-Gobain Weber.

TABLE 2

Average chemical composition of a comparative media A, in average wt %.

| $SiO_2$ | $Al_2O_3$ | $FeO_3$ | $K_2O$ | MgO | CaO | $Na_2O$ | $TiO_2$ | C tot |
|---|---|---|---|---|---|---|---|---|
| 62% | 18% | 8% | 5% | 3% | 2% | 1% | 3% | 2% |

Comparative media A had an Si:Ca molar ratio of approximately 0.97:1, as shown in Table 3. Comparative media A had a maximum absorption capacity of 9.2 lbs (4.2 kg) of phosphorus per cubic yard (0.76 m$^3$) of comparative commercial media (0.006 g per cm$^3$), based on a 100% conversion of the calcium to a tri-calcium phosphate compound having a molar ratio of Ca:P of 1.5:1. Production of this media requires a vitrification temperature of at least about 2050° F. (1121° C.).

TABLE 3

Calculation of Si and Ca content of reactive media of comparative media A

Comparative Prior Art Media Commercially Available

| Mass (lbs) | Component | % Purity | Cpd | Mass Si/Ca cpd (lbs) | MW Ca or Si | MW O | Total MW of Si/Ca cpd | Mass % of Si or Ca in cpd | Mass of Si or Ca in component | Moles of Si or Ca in Component |
|---|---|---|---|---|---|---|---|---|---|---|
| 250 | Clay | 62.0% | SiO2 | 155 | 28 | 16 | 60 | 0.47 | 72.33 | 2.58 |
| 250 | Clay | 2.0% | CaO | 5 | 40 | 16 | 56 | 0.71 | 3.57 | 0.09 |
| 0 | Quick Lime | 0.0% | CaO | 0 | 40 | 16 | 56 | 0.71 | 0.00 | 0.00 |
| 0 | | 0.0% | SiO2 | 0 | 28 | 16 | 60 | 0.47 | 0.00 | 0.00 |
| 0 | Water | 100.0% | Water | 70 | | | | | | |
| 0 | Peat | 100.0% | Peat | 0 | 0 | 0 | 0 | | 3.57 | |
| 250 | Total mass | | | | | | | | | |
| 250 | Mass post-vitrification, with loss of water and 10% peat as ash. | | | | Wt % Si | | 28.93% | | Moles Si | 2.58 |
| | | | | | Wt % Ca | | 1.43% | | Moles Ca | 0.09 |
| | | | | Wt ratio Ca:Si | | | 0.05 | | Mole percent Si in Ca | 0.97 |

Comparative Example B. Reactive Media

As a further example of prior art reactive media, following the procedure of U.S. Pat. No. 9,254,582, approximately 250 pounds (113 kg) of raw, wet clay with a 35% moisture content, was obtained from a fractionating sand mine and was placed in a concrete mortar mixing device and mixing was commenced. To the mixing wet clay, 25 pounds (11.3 kg) of Canadian peat was added and allowed to mix to uniformity. Once uniformly mixed, 25 pounds (11.3 kg) of quicklime with a calcium content of approximately 94 wt % CaO was added slowly so as to develop a uniform distribution throughout the mixing clay material. The mixture was allowed to mix for 10 minutes following completion of the addition of the CaO. The addition of CaO caused an exothermic reaction as the CaO was hydrated by the water contained in the mixture. Upon completion of the mixing step, the material was removed from the mixing device and allowed to cool to ambient temperature for about 2-4 hours. Once cooled to ambient temperature, the cooled mixture was extruded through a 4" (10.2 cm) extruder to form discrete pellets of approximately ⅜" (0.95 cm) diameter by approximately ½" to ¾" (1.3 cm to 1.9 cm) in length. Once extruded, the pellets were heated to approximately 2050° F. (1121° C.) with a soak time of approximately 30 minutes. The final composition of the partially vitrified pellets is shown in Table 4. Comparative media B had an Si:Ca molar ratio of approximately 0.60:1, as shown in Table 5. Comparative media B had a maximum absorption capacity of 52 lbs (23 kg) of phosphorus per cubic yard (0.76 m³) of comparative commercial media (0.030 g per cm³), based on a 100% conversion of the calcium to a tri-calcium phosphate compound having a molar ratio of Ca:P of 1.5:1.

TABLE 4

Average chemical composition of comparative media B, in average wt %.

| Element | wt % |
|---|---|
| Aluminum | 2.0000% |
| Arsenic | 0.0022% |
| Barium | 0.0003% |
| Calcium | 8.2000% |
| Iron | 2.4000% |

TABLE 4-continued

Average chemical composition of comparative media B, in average wt %.

| Element | wt % |
|---|---|
| Magnesium | 0.5200% |
| Nickel | 0.0007% |
| Potassium | 0.9300% |
| Silicon | 15.7000% |
| Sodium | 0.0320% |
| Titanium | 0.0031% |

TABLE 5

Si and Ca content of reactive media of comparative media B

| | | | | Prior Art Example | | | | % | Wt | Moles |
|---|---|---|---|---|---|---|---|---|---|---|
| Mass (lbs) | Component | % Purity | Cpd | Mass Si/Ca cpd (lbs) | MW Ca or Si | MW O | Total MW of Si/Ca cpd | Mass % of Si or Ca in cpd | Mass of Si or Ca in component | Moles of Si or Ca in Component |
| 250 | Clay | 15.7% | SiO2 | 39.25 | 28 | 16 | 60 | 0.47 | 18.32 | 0.65 |
| 250 | Clay | 0.8% | CaO | 1.95 | 40 | 16 | 56 | 0.71 | 1.39 | 0.03 |
| 25 | Quick Lime | 94.0% | CaO | 23.5 | 40 | 16 | 56 | 0.71 | 16.79 | 0.42 |
| 25 | | 6.0% | SiO2 | 1.5 | 28 | 16 | 60 | 0.47 | 0.70 | 0.03 |
| 70 | Water | 100.0% | Water | 70 | | | | | | |
| 25 | Peat | 100.0% | Peat | 25 | 0 | 0 | 0 | | 18.18 | |
| 370 | Total mass | | | | | | | | | |
| 302.5 | Mass post-vitrification, with loss of water and 10% peat as ash. | | | | Wt % Si | 6.29% | | | Moles Si | 0.68 |
| | | | | | Wt % Ca | 6.01% | | | Moles Ca | 0.45 |
| | | | | Wt ratio Ca:Si | | 0.96 | | | Mole percent Si in Ca | 0.60 |

Example 1. Production of Reactive Media

A mortar-style mixer was used in this Example, although another suitable mixing device could be used such as a paddle or ribbon blender. In the mortar mixer, 250 lbs (113 kg) of red clay having the composition described in Table 1 and having about a 5 wt % moisture content, was mixed with 25 lbs (11.3 kg) of Canadian peat, (optionally, not performed in this Example, this can be substituted or supplemented by sawdust or other combustible organic material with an ash content of less than 10 wt %), 5 lbs (2.3 kg) of quicklime with a CaO content of 94 wt % or greater, 45 lbs (20.4 kg) of dolomite containing at least 10 wt % magnesium. These materials were mixed in their native state for approximately 5 minutes after which 70 lbs (31.8 kg) of water was slowly added to form a uniformly moist mixture. This moist mixture was mixed for an additional 5 minutes and then was removed from the mixer. Upon removal of the mixture, it was fed uniformly through an extrusion device to produce a pellet. The extrusion die was considered a shearing plate die so as to avoid unnecessary compression of the pellet which could reduce its ultimate porosity. Optionally, not performed in this Example, for enhanced pellet compression, extrusion can be performed under vacuum to remove entrained air. Following the extrusion process, the resulting pellets were placed in a kiln where they were heated to a final temperature of approximately 1950° F. The final pellets had a diameter of 0.25" to 0.38" (0.64 cm to 0.95 cm) and a length of 0.25" to 1" (0.64 cm to 2.54 cm). The reactive media had a Ca:Si molar ratio of 0.81:1, as shown in Table 6.

TABLE 6

Calculation of Si and Ca content of reactive media of Example 1

| Green Mixture When Quicklime/Dolomite is used | | | | | | | | % | Wt | Moles |
|---|---|---|---|---|---|---|---|---|---|---|
| Mass (lbs) | Component | % Purity | Cpd | Mass Si/Ca cpd (lbs) | MW Ca or Si | MW O | Total MW of Si/Ca cpd | Mass % of Si or Ca in cpd | Mass of Si or Ca in component | Moles of Si or Ca in Component |
| 250 | Clay | 59.6% | SiO2 | 149 | 28 | 16 | 60 | 0.47 | 69.53 | 2.48 |
| 250 | Clay | 0.8% | CaO | 1.95 | 40 | 16 | 56 | 0.71 | 1.39 | 0.03 |
| 5 | quick lime | 94.0% | CaO | 4.7 | 40 | 16 | 56 | 0.71 | 3.36 | 0.08 |
| 5 | quick lime | 6.0% | SiO2 | 0.3 | 28 | 16 | 60 | 0.47 | 0.14 | 0.01 |
| 50 | Dolomite | 90.0% | CaCO3 | 45 | 40 | 16 | 100 | 0.40 | 18.00 | 0.45 |
| 50 | Dolomite | 10.0% | MgO | 0 | | | | | 0.00 | 0.00 |
| 50 | Dolomite | 6.0% | SiO2 | 0 | 28 | 16 | 60 | 0.47 | 0.01 | 0.00 |
| 25 | Peat | 100.0% | Peat | 0 | | | | | 0.00 | |
| 60 | Water | 100.0% | Water | 0 | | | | | 0.00 | |
| 390 | Total mass | | | | | Wt % Si | 22.66% | | Moles Si | 2.49 |
| 307.5 | Mass post-vitrification, with loss of water and 10% peat as ash. | | | | | Wt % Ca | 7.40% | | Moles Ca | 0.57 |
| | | | | | | Ca:Si Ratio | 0.33 | | Mole percent Si in Ca | 0.81 |

Example 2. Continuous Removal of Phosphorus from Water

Materials were added to a reaction vessel according to Table 7 (i.e., aqueous solutions) to produce a starting volume of Ferrate.

TABLE 7

Ferrate starting material.

| Component | Amount |
|---|---|
| 50% (w/v) sodium hydroxide | 6000 mL |
| 12.5% (w/v) sodium hypochlorite | 3000 mL |
| 40 wt % FeCl3 | 1000 mL |

An aqueous 50% (w/v) sodium hydroxide solution was placed into a jacketed mixing or reaction vessel. An aqueous 12.5% (w/v) sodium hypochlorite solution was added. The sodium hydroxide and sodium hypochlorite solutions were mixed as they reacted exothermically. During the reaction, the reaction vessel was cooled by means of circulating chilled water or other cooling liquid through the cooling jacket of the reaction vessel. After about 20 minutes, once the reaction mixture had cooled to approximately 95° F. (35° C.), an aqueous 40 wt % ferric chloride solution was added. The reaction mixture was stirred and another exothermic reaction occurred. The temperature was allowed to rise to a maximum of 120° F. (49° C.) and to mix for a period of 40 minutes. The ferrate concentration of the reaction mixture was measured via a spectrophotometer via the absorbance at 510 nm. The concentration of the ferrate was 20 g/L expressed as a concentration of ferrate ($FeO_4^{2-}$), corresponding to a percent yield from ferric chloride of 33%

Water at ambient temperature of approximately 82° F. (28° C.) and containing phosphorus was obtained from Lake Apopka, in Florida, and was first filtered to remove particulates using a filter having a pore size of 100 microns. Following the initial filtration, 1 to 3 ppm (measured as $FeO_4^{2-}$ of the ferrate reaction mixture) was added to the filtered water and mixing occurred in the pipe or static mixer. The mixture was then allowed to react in a mixing tank for approximately 10 minutes to oxidize the phosphorus with the ferrate. The amount of added ferrate solution was determined experimentally using a 6 gang Phipps and Bird gang stirrer. Additions ranging from 0.25 ppm to 5 ppm were evaluated and the effective addition was found to be 1-3 ppm (e.g., concentration of ferrate with effective phosphorus removal wherein increased concentration of ferrate results in little to no increased phosphorus removal). Due to the basicity of the ferrate reaction mixture, the addition of the ferrate reaction mixture caused an increase in the pH of the water including the phosphorus to approximately 10.5.

An aqueous 50% (w/v) sodium hydroxide solution was added to the ferrate-treated water (oxidized water) to elevate the pH to approximately 10.8 prior to introduction into 4 parallel, 8" (20.3 cm) diameter reactive media columns with a bed depth of approximately 48" (121.9 cm). The amount of base was controlled continuously using a Hach SC200 Ph Controller with a set point of 10.8. The oxidized and pH-adjusted water was then fed to the columns of reactive media described above using a flow rate of approximately 10 GPM (37.9 LPM), which was about 7.2 gallons (27.3 L) per minute per square foot (0.093 m³) of media cross-sectional area.

Following passage through the reactive media column, the treated water was again filtered using a filter having a pore size of 1 micron to capture any particulate phosphorus that escaped the media column. Following this final filtration, the water was neutralized to meet the necessary discharge requirements to a pH of less than 8.5 with citric acid. Total and dissolved reactive phosphorus concentrations were measured using a Hach Model DR 6000 spectrophotometer and utilizing the standard analytical method associated therewith which are EPA 365.1, 365.2, 365.3, and 356.4 compliant.

Phosphorus removal was measured by comparing both total and dissolved phosphorus concentrations of the incoming water with those of the treated water. The incoming water had approximately 100 parts per billion total phosphorus and about 20 parts per billion dissolved reactive phosphorus. The water following treatment measured in the undetectable range (less than 10 ppb) for both total and dissolved reactive phosphorus. The treated water had an iron concentration of 1.39 mg/L. The reactive media of the present Example had a maximum absorption capacity of 55 lbs (25 kg) of phosphorus per cubic yard (0.76 m³) of comparative commercial media (0.033 g per cm³), based on a 100% conversion of the calcium to a tri-calcium phosphate compound having a molar ratio of Ca:P of 1.5:1.

Example 3. Stability of Ferrate Formed Via Basic Ferrate Starting Material Mixture Ferrate produced by the method described in Example 2 has been found to be stable for a limited amount of time. Typically the ferrate solution degraded such that the $FeO_4^{2-}$ concentration was reduced by 50 wt % within about 4-6 hours necessitating a frequent make up cycle and a need for on-site synthesis equipment. A sample of the ferrate reaction mixture of Example 2 was removed and was monitored for ferrate concentration over time at room temperature, without shielding the solution from light, with the results given in Table 8. The concentration was determined by determining the absorbance at 510 nanometers and applying the Beer-Lambert equation for calculating concentration therefrom. The measurement was carried out using an Ocean Optics spectrophotometer.

TABLE 8

Strength of ferrate reaction mixture of Example 2 over time at room temperature.

| Time (h:m) | Ferrate concentration (g/L) | % Degradation |
|---|---|---|
| 0:00 | 18.9 | 0 |
| 1:00 | 18.5 | 2.1% |
| 2:10 | 16.6 | 14% |
| 6:06 | 9 | 52% |

Example 4. Small Scale Formation of Ferrate from Ferric Chloride and Potassium Permanganate A solution of 38-42% (w/v) $FeCl_3$ in water (2.5 g, 1.82 mL, 1 g $FeCl_3$, 6.17 mmol $FeCl_3$) and having a pH of about 2 (due to about 5 wt % of 37% w/w HCl in solution, or about 1.5 wt % HCl) was added to a 50 mL beaker, along with a stir bar, and was set on a stir plate which was then set to stir at 300 RPM, which was sufficient to mix to homogeneity. Potassium permanganate (99% purity, 0.5 g raw material, 0.495 g $KMnO_4$, 3.13 mmol $KMnO_4$) was added. The reaction mixture was allowed to react for 5 minutes while mixing. DI water (10 mL) was added at the end of the stirring, to prevent formation of a paste. The pH of the reaction mixture was 2.3.

Deionized (DI) water (50 g) was measured on a balance. About 0.06 g to 0.08 g of the reaction mixture was added to the DI water. Shortly afterwards, absorbance of a sample of the ferrate solution was measured on an Ocean Optics Spectrophotometer at 510 nm and at 525 nm. The absorbances were 0.58 at 510 nm and 0.74 at 525 nm, indicating a concentration of ferrate in the sample analyzed of about 52.6 g/L, representing an initial concentration of ferrate in the reaction mixture, of about 315.6 g/L, or about 2.64 M, and indicating a total yield of ferrate of 631.2 mg or 5.28 mmol, which was 84.85% yield from the ferric chloride.

Example 5. Large Scale Formation of Ferrate from Ferric Chloride and Potassium Permanganate A solution of 38-42% (w/v) $FeCl_3$ in water (50 g, 36.4 mL, 20 g $FeCl_3$, 123.3 mmol $FeCl_3$) and having a pH of about 2 (due to about 5 wt % of 37% w/w HCl in solution, or about 1.5 wt % HCl) was added to a 600 mL beaker, along with a stir bar, and was set on a stir plate which was then set to stir at 1000 RPM, which was sufficient to mix to homogeneity. Potassium permanganate (99% purity, 10 g raw material, 9.9 g $KMnO_4$, 62.6 mmol $KMnO_4$) was added. The reaction mixture was allowed to react for 5 minutes while mixing. The pH of the reaction mixture was 2.3. DI water (200 mL) was added at the end of the stirring, to prevent formation of a paste.

Deionized (DI) water (50 g) was measured on a balance. About 0.06 g to 0.08 g of the reaction mixture was added to the DI water. Shortly afterwards, absorbance of a sample of the ferrate solution was measured on an Ocean Optics Spectrophotometer at 510 nm and at 525 nm. The absorbances were 0.58 at 510 nm and 0.67 at 525 nm, indicating a concentration of ferrate in the sample analyzed of about 53.2 g/L, or about 0.44 M, and a total concentration of ferrate in the reaction mixture of about 319.4 g/L, or about 2.66 M, indicating a total yield of ferrate of, which was 84.45% yield from the ferric chloride.

Example 6. Stability of Ferrate Formed from Ferric Chloride and Potassium Permanganate Ferrate produced by the method described in Example 4 was monitored for ferrate concentration over time at room temperature, without shielding the solution from light, with the results given in Table 9. The concentration was determined by determining the absorbance at 510 nanometers and applying the Beer-Lambert equation for calculating concentration therefrom.

TABLE 9

Strength of ferrate reaction mixture of Example 4 over time at room temperature.

| Run | Time (days) | Ferrate concentration (g/L) | % Degradation |
|---|---|---|---|
| 1 | 0 | 209.40 | 0% |
|   | 5 | 186.13 | 11% |
|   | 6 | 183.88 | 12% |
|   | 7 | 176.38 | 16% |
| 2 | 0 | 256.0071 | 0% |
|   | 1 | 234.6731 | 8% |
|   | 2 | 185.8719 | 28% |
|   | 4 | 159.2299 | 38% |
|   | 13 | 98.08137 | 64% |

Example 7. Oxidation-Reduction Potential (ORP)

Ferrate exhibits low oxidation potential when in a basic environment, and high oxidation potential in acidic environments. A significant disadvantage of conventional ferrate mixtures is that they are only stable in basic solution, and in particular, ferrates formed according to Example 2 above has a solution pH of about 12.2 and when even small amounts are added to an aqueous solution, the aqueous solution pH is immediately raised to approximately 10.5, a pH where ferrate has a lower oxidation potential. By comparison, the process of producing ferrate from ferric chloride and potassium permanganate in an acidic medium described in Examples 4 and 5 herein generate a ferrate solution having a pH of approximately 3.5 to 4.0. When added in small amounts to an aqueous solution, the resulting pH of the aqueous solution remains below 7, or at least slightly acidic. To illustrate the importance of this relationship, acidic ferrate solutions prepared according to Examples 4 and 5 above were prepared, and about 0.072 grams of each ferrate solution were added to 50 grams of distilled water, to form two different diluted ferrate solutions. The starting pH and ORP were measured and recorded for each solution. A solution of 5% sodium hydroxide was then added dropwise to raise the pH. The adjusted solution was allowed to mix until the pH reading was stable. The ORP meter was placed in the solution and allowed to stabilize for 2 minutes and the reading was recorded. The ORP was measured using an Oakton Model 10 ORP Meter. Similarly, approximately 0.072 grams of basic ferrate solution, produced according to Example 2 above was placed in 50 grams of distilled water. The starting pH and ORP were measured and recorded. A solution of 5% sulfuric acid was then added dropwise to lower the pH. The adjusted solution was allowed to mix until the pH reading was stable. The ORP meter was placed in the solution and allowed to stabilize for 2 minutes and the reading recorded. The ORP was measured using an Oakton Model 10 ORP Meter. Table 10 shows the individual pH and corresponding ORP measurements of acidic and basic ferrate solutions during pH modification.

TABLE 10

Oxidation reduction potential and pH of acidic and basic ferrate solutions at various pH.

| Starting with acidic ferrate solution | | Starting with basic ferrate solution | |
|---|---|---|---|
| pH | ORP | pH | ORP |
| 3.38 | 927 | 12.49 | 338 |
| 3.86 | 892 | 12.3 | 394 |
| 4.1 | 878 | 12.06 | 421 |
| 5.5 | 741 | 11.28 | 491 |
| 6.26 | 730 | 10.51 | 534 |
|  |  | 9.72 | 617 |
|  |  | 9.13 | 653 |
|  |  | 8.52 | 702 |

Example 8. Continuous Removal of Phosphorus from Water Using Acidic Ferrate

Example 2 was repeated, but acidic ferrate formed via the method of Example 5 was used instead of the basic ferrate formed from sodium hydroxide, sodium hypochlorite, and ferric chloride. Instead of the effective concentration of 1-3 ppm ferrate used in Example 2, the effective concentration of the acidic ferrate was found to be 0.5-1 ppm. After oxidation of the phosphorus with the acidic ferrate, a greater amount of the aqueous 50% (w/v) sodium hydroxide solution needed to be added (as compared to Example 2) to basify the reaction mixture to pH 10.8 prior to flowing through the reactive media. An at least equivalent amount of phosphorus oxidation and removal was achieved using the acidic ferrate, as compared to Example 2; however, the final treated water from the acidic ferrate procedure had a lower final iron concentration of 0.24-0.46 mg/L.

Example 9. Continuous Removal of Phosphorus from Water Using Ferric Chloride as an Oxidizer Example 2 was repeated, but ferric chloride as an aqueous 40 wt % solution was used instead of the basic ferrate formed from sodium hydroxide, sodium hypochlorite, and ferric chloride. The effective concentration of the ferric chloride was found to be 1-3 ppm. Prior to the addition of ferric chloride, approximately 2 ppm of sodium hypochlorite was added to assist with the oxidation of the phosphorus (without sodium hypochlorite, 3-4 ppm ferric chloride was needed to achieve the same results). After oxidation of the phosphorus with the sodium hypochlorite and ferric chloride, an amount of the aqueous 50% (w/v) sodium hydroxide solution was added to basify the reaction mixture to pH 10.8 prior to flowing through the reactive media. An at least equivalent amount of phosphorus oxidation and removal was achieved using the sodium hypochlorite and ferric chloride, as compared to Example 2; however, the final treated water from the acidic ferrate procedure had a lower final iron concentration of 0.68 mg/L.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments

The following exemplary embodiments are provided, the numbering of which is not to be construed as designating levels of importance:

Embodiment 1 provides a reactive media comprising: a ceramic; and reactive calcium available to form a solid calcium salt with an anionic material.

Embodiment 2 provides the reactive media of Embodiment 1, wherein the ceramic is about 50 wt % to about 100 wt % of the reactive media.

Embodiment 3 provides the reactive media of any one of Embodiments 1-2, wherein the ceramic is about 80 wt % to about 99 wt % of the reactive media.

Embodiment 4 provides the reactive media of any one of Embodiments 1-3, wherein the ceramic comprises a calcium silicate, an iron silicate, an aluminum silicate, an other silicate, or a combination thereof.

Embodiment 5 provides the reactive media of any one of Embodiments 1-4, wherein the ceramic comprises a calcium silicate.

Embodiment 6 provides the reactive media of Embodiment 5, wherein the calcium silicate is 0.1 wt % to about 80 wt % of the reactive media.

Embodiment 7 provides the reactive media of any one of Embodiments 5-6, wherein the calcium silicate is 2 wt % to about 4 wt % of the reactive media.

Embodiment 8 provides the reactive media of any one of Embodiments 5-7, wherein the calcium silicate is $CaSiO_3$, $Ca_2SiO_4$, $Ca_3SiO_5$, $Ca_3Si_2O_7$, or a combination thereof.

Embodiment 9 provides the reactive media of any one of Embodiments 1-8, wherein the reactive calcium as CaO is about 0.01 wt % to about 99 wt % of the reactive media, wherein the reactive calcium is in the form of any water-soluble salt or inorganic compound including the reactive calcium.

Embodiment 10 provides the reactive media of any one of Embodiments 1-9, wherein the reactive calcium as CaO is about 14 wt % to about 18 wt % of the reactive media, wherein the reactive calcium is in the form of any water-soluble salt or inorganic compound including the reactive calcium.

Embodiment 11 provides the reactive media of any one of Embodiments 1-10, wherein the reactive calcium is comprised in a calcium material that is a calcium salt, an inorganic calcium compound, or a combination thereof.

Embodiment 12 provides the reactive media of Embodiment 11, wherein the calcium material reacts with the anionic material to form the solid calcium salt at a pH of about 9 to about 14.

Embodiment 13 provides the reactive media of any one of Embodiments 11-12, wherein the calcium material reacts with the anionic material to form the solid calcium salt at a pH of about 10 to about 12.

Embodiment 14 provides the reactive media of any one of Embodiments 11-13, wherein the calcium material is CaO, $Ca(OH)_2$, or a combination thereof.

Embodiment 15 provides the reactive media of any one of Embodiments 1-14, wherein about 0.01 wt % to about 99 wt % of the reactive media is CaO.

Embodiment 16 provides the reactive media of any one of Embodiments 1-15, wherein about 14 wt % to about 18 wt % of the reactive media is CaO.

Embodiment 17 provides the reactive media of any one of Embodiments 11-16, wherein the calcium material reacts with an anionic impurity to form a solid calcium salt.

Embodiment 18 provides the reactive media of any one of Embodiments 11-17, wherein the calcium material reacts with a carbonate anion to form calcium carbonate.

Embodiment 19 provides the reactive media of any one of Embodiments 11-18, wherein the calcium material reacts with a phosphate anion to form calcium phosphate.

Embodiment 20 provides the reactive media of any one of Embodiments 1-19, wherein the mole % Si in Ca in the reactive media is about 1% to about 99%.

Embodiment 21 provides the reactive media of any one of Embodiments 1-20, wherein the mole % Si in Ca in the reactive media is about 70% to about 90%.

Embodiment 22 provides the reactive media of any one of Embodiments 1-21, wherein about 0.01 wt % to about 30 wt % of the reactive media is magnesium.

Embodiment 23 provides the reactive media of any one of Embodiments 1-22, wherein about 1 wt % to about 2 wt % of the reactive media is magnesium.

Embodiment 24 provides the reactive media of any one of Embodiments 1-23, wherein the reactive media is a reaction product of vitrification of a reactive media starting material mixture.

Embodiment 25 provides a reactive media comprising:
a ceramic that is about 80 wt % to about 99 wt % of the reactive media; and
reactive calcium that is available to form a solid calcium salt at pH of about 9 to about 14 with phosphate or carbonate in aqueous solution, wherein the reactive calcium as CaO is about 14 wt % to about 18 wt % of the reactive media, wherein the reactive calcium is in the form of a water-soluble salt or inorganic compound including the reactive calcium.

Embodiment 26 provides a method of using the reactive media of any one of Embodiments 1-25, the method comprising:
contacting water comprising the anionic material with the reactive media to form the solid calcium salt.

Embodiment 27 provides the method of Embodiment 26, wherein the anionic material is oxidized phosphorus, wherein the solid calcium salt is a calcium phosphate salt.

Embodiment 28 provides the method of Embodiment 27, wherein the oxidized phosphorus is phosphate, wherein the solid calcium salt is a calcium phosphate salt.

Embodiment 29 provides the method of any one of Embodiments 26-27, wherein the anionic material is carbonate, wherein the solid calcium salt is calcium carbonate.

Embodiment 30 provides the method of Embodiment 29, further comprising heating the spent reactive media to form CaO, $Ca(OH)_2$, or a combination thereof, from the calcium carbonate, thereby at least partially regenerating the reactive media.

Embodiment 31 provides the method of any one of Embodiments 26-30, wherein during the contacting of the water comprising the anionic material with the reactive media the water comprising the anionic material has a pH of about 1 to about 14.

Embodiment 32 provides the method of any one of Embodiments 26-31, wherein during the contacting of the water comprising the anionic material with the reactive media the water comprising the anionic material has a pH of about 9 to about 14.

Embodiment 33 provides the method of any one of Embodiments 26-32, further comprising controlling the pH of the water comprising the anionic material before or during the contacting of the water comprising the anionic material with the reactive media.

Embodiment 34 provides the method of any one of Embodiments 26-33, further comprising neutralizing the pH of the filtered water.

Embodiment 35 provides a method of making the reactive media of any one of Embodiments 26-34, the method comprising:
heating a reactive media starting material mixture, to provide the reactive media.

Embodiment 36 provides the method of Embodiment 35, wherein the reactive media starting material comprises clay.

Embodiment 37 provides the method of Embodiment 36, wherein the clay is about 50 wt % to about 90 wt % of the reactive media starting material.

Embodiment 38 provides the method of any one of Embodiments 36-37, wherein the clay is about 50 wt % to about 80 wt % of the reactive media starting material.

Embodiment 39 provides the method of any one of Embodiments 36-38, wherein the clay is a non-clumping clay.

Embodiment 40 provides the method of any one of Embodiments 36-39, wherein the clay is a non-bentonite clay.

Embodiment 41 provides the method of any one of Embodiments 36-40, wherein the clay is a non-clumping clay.

Embodiment 42 provides the method of any one of Embodiments 36-41, wherein the clay comprises calcium silicates, iron silicates, aluminum silicates, or a combination thereof.

Embodiment 43 provides the method of any one of Embodiments 36-42, wherein the clay is kaolinite, illite, gibbsite, silt, silica, or a combination thereof.

Embodiment 44 provides the method of any one of Embodiments 35-43, wherein the reactive media starting material comprises a calcium source.

Embodiment 45 provides the method of Embodiment 44, wherein the calcium source is about 0.01 wt % to about 99 wt % of the reactive media starting material.

Embodiment 46 provides the method of any one of Embodiments 44-45, wherein the calcium source is about 5 wt % to about 20 wt % of the reactive media starting material.

Embodiment 47 provides the method of any one of Embodiments 44-46, wherein the calcium source is a calcium silicate, CaO, Ca(OH)$_2$, CaCO$_3$, limestone, dolomitic limestone, or a combination thereof.

Embodiment 48 provides the method of any one of Embodiments 44-47, wherein the calcium source is CaCO$_3$ and CaO.

Embodiment 49 provides the method of any one of Embodiments 44-48, wherein the calcium source is limestone and CaO.

Embodiment 50 provides the method of any one of Embodiments 44-49, wherein the calcium source is dolomitic limestone and CaO.

Embodiment 51 provides the method of any one of Embodiments 35-50, wherein about 0 wt % to about 100 wt % of the reactive media starting material is CaO.

Embodiment 52 provides the method of any one of Embodiments 35-51, wherein about 0.01 wt % to about 5 wt % of the reactive media starting material is CaO.

Embodiment 53 provides the method of any one of Embodiments 35-52, wherein about 0.01 wt % to about 100 wt % of the reactive media starting material is CaCO$_3$.

Embodiment 54 provides the method of any one of Embodiments 35-53, wherein the about 0.1 wt % to about 10 wt % of the reactive media starting material is CaCO$_3$.

Embodiment 55 provides the method of any one of Embodiments 35-54, wherein about 0.01 wt % to about 100 wt % of the reactive media starting material is dolomite.

Embodiment 56 provides the method of any one of Embodiments 35-55, wherein about 1 wt % to about 30 wt % of the reactive media starting material is dolomite.

Embodiment 57 provides the method of any one of Embodiments 35-56, wherein about 0.01 wt % to about 99 wt % of the reactive media starting material is dolomitic limestone.

Embodiment 58 provides the method of any one of Embodiments 35-57, wherein about 5 wt % to about 20 wt % of the reactive media starting material is dolomitic limestone.

Embodiment 59 provides the method of any one of Embodiments 35-58, wherein about 0.01 wt % to about 100 wt % of the reactive media starting material is reactive calcium as CaO, wherein the reactive calcium in the reactive media starting material is in the form of any water-soluble salt or inorganic compound including the reactive calcium.

Embodiment 60 provides the method of any one of Embodiments 35-59, wherein about 15 wt % to about 25 wt % of the reactive media starting material is reactive calcium as CaO, wherein the reactive calcium in the reactive media starting material is in the form of any water-soluble salt or inorganic compound including the reactive calcium.

Embodiment 61 provides the method of any one of Embodiments 35-60, wherein about 1 wt % to about 40 wt % of the reactive media starting material is calcium.

Embodiment 62 provides the method of any one of Embodiments 35-61, wherein the about 1 wt % to about 20 wt % of the reactive media starting material is calcium.

Embodiment 63 provides the method of any one of Embodiments 35-62, wherein the reactive media starting material comprises a magnesium source.

Embodiment 64 provides the method of Embodiment 63, wherein the magnesium source is about 0.01 wt % to about 99 wt % of the reactive media starting material.

Embodiment 65 provides the method of any one of Embodiments 63-64, wherein the magnesium source is about 5 wt % to about 20 wt % of the reactive media starting material.

Embodiment 66 provides the method of any one of Embodiments 63-65, wherein the magnesium source is dolomitic limestone, dolomite (CaMg(CO$_3$)$_2$), magnesium oxide, magnesium carbonate, fly ash, cement kiln dust, an industrial byproduct including Mg, or a combination thereof.

Embodiment 67 provides the method of any one of Embodiments 63-66, wherein the magnesium source is dolomitic limestone.

Embodiment 68 provides the method of any one of Embodiments 63-67, wherein the magnesium source is the same as a calcium source.

Embodiment 69 provides the method of any one of Embodiments 35-68, wherein the reactive media starting material comprises an organic material.

Embodiment 70 provides the method of Embodiment 69, wherein the organic material is about 0.01 wt % to about 50 wt % of the reactive media starting material.

Embodiment 71 provides the method of any one of Embodiments 69-70, wherein the organic material is about 1 wt % to about 20 wt % of the reactive media starting material.

Embodiment 72 provides the method of any one of Embodiments 69-71, wherein the organic material is saw dust, wood residue, cellulose fiber, lake bottom sludge, peat, organic agricultural or industrial residue, or a combination thereof.

Embodiment 73 provides the method of any one of Embodiments 69-72, wherein the organic material is peat.

Embodiment 74 provides the method of any one of Embodiments 35-73, wherein the reactive media starting material comprises a clay source, a calcium source, a magnesium source, and an organic material.

Embodiment 75 provides the method of Embodiment 74, wherein the calcium source and the magnesium source are the same.

Embodiment 76 provides the method of any one of Embodiments 35-75, wherein the reactive media starting material comprises a non-clumping clay, CaO, dolomitic limestone, peat, and water.

Embodiment 77 provides the method of any one of Embodiments 35-76, wherein forming the reactive media comprises drying a wet reactive media starting material to form the reactive media starting material.

Embodiment 78 provides the method of Embodiment 77, wherein drying the reactive media starting material comprises heating to a temperature of about 30° C. to about 3,000° C.

Embodiment 79 provides the method of any one of Embodiments 77-78, wherein drying the reactive media starting material comprises heating to a temperature of about 30° C. to about 300° C.

Embodiment 80 provides the method of any one of Embodiments 77-79, wherein drying the reactive media starting material comprises drying to a moisture content of about 0 wt % to about 50 wt %.

Embodiment 81 provides the method of any one of Embodiments 77-80, wherein drying the reactive media starting material comprises drying to a moisture content of about 10 wt % to about 30 wt %.

Embodiment 82 provides the method of any one of Embodiments 35-81, wherein forming the reactive media comprises vitrifying the reactive media starting material.

Embodiment 83 provides the method of Embodiment 82, wherein vitrifying the reactive media starting material comprises heating to a temperature of about 500° C. to about 3000° C.

Embodiment 84 provides the method of any one of Embodiments 82-83, wherein vitrifying the reactive media starting material comprises heating to a temperature of about 900° C. to about 1100° C.

Embodiment 85 provides the method of any one of Embodiments 35-84, wherein forming the reactive media comprises forming a calcium silicate from calcium and silicon in the reactive media starting material.

Embodiment 86 provides the method of any one of Embodiments 85-85, wherein the calcium silicate is $CaSiO_3$, $Ca_2SiO_4$, $Ca_3SiO_5$, $Ca_3Si_2O_7$, or a combination thereof.

Embodiment 87 provides the method of any one of Embodiments 35-86, wherein forming the reactive media comprises forming CaO from $Ca(OH)_2$ in the reactive media starting material.

Embodiment 88 provides the method of any one of Embodiments 35-87, wherein forming the reactive media comprises extruding the reactive media starting material or extruding reactive media formed therefrom.

Embodiment 89 provides the method of any one of Embodiments 35-88, wherein the temperature used during formation of the reactive media from the reactive media starting material does not exceed about 1,100° C.

Embodiment 90 provides the method of any one of Embodiments 35-89, wherein the temperature used during formation of the reactive media from the reactive media starting material does not exceed about 1,070° C.

Embodiment 91 provides the method of any one of Embodiments 35-90, wherein the mole % Si in Ca of the reactive media starting material is about 1% to about 99%.

Embodiment 92 provides the method of any one of Embodiments 35-91, wherein the mole % Si in Ca of the reactive media starting material is about 70% to about 90%.

Embodiment 93 provides the method of any one of Embodiments 35-92, wherein the mole % Si in Ca in the reactive media starting material is such that the reactive media starting material has a melting point within about 0° C. to about 300° C. of a eutectic point melting temperature.

Embodiment 94 provides the method of any one of Embodiments 35-93, wherein mole % Si in Ca in the reactive media starting material is such that the reactive media starting material has a melting point within 0° C. to about 10° C. of a eutectic point melting temperature.

Embodiment 95 provides a method of making the reactive media of any one of Embodiments 1-25, the method comprising:
heating a reactive media starting material mixture comprising mole % Si in Ca of about 83% to about 90% to a temperature that does not exceed about 1,070° C., to at least partially vitrify the reactive media starting material and provide the reactive media.

Embodiment 96 provides a method of making the reactive media of any one of Embodiments 1-25, the method comprising:
heating a reactive media starting material mixture comprising a non-clumping clay, dolomitic limestone, CaO, and peat, to at least partially vitrify the reactive media starting material and provide the reactive media.

Embodiment 97 provides a method of making the reactive media of any one of Embodiments 1-25, the method comprising:
heating a reactive media starting material mixture to at least partially vitrify the reactive media starting material and provide the reactive media, wherein
about 50 wt % to about 80 wt % of the reactive media starting material mixture is a non-clumping clay,
about 5 wt % to about 20 wt % of the reactive media starting material mixture is dolomitic limestone, such that about 0.1 wt % to about 5 wt % of the reactive media starting material is magnesium,
about 0.1 wt % to about 10 wt % of the reactive media starting material mixture is $CaCO_3$,
about 0.01 wt % to about 5 wt % of the reactive media starting material mixture is CaO,
about 1 wt % to about 20 wt % of the reactive media starting material mixture is peat, and
about 0 wt % to about 30 wt % of the reactive media starting material mixture is water.

Embodiment 98 provides a method of making the reactive media of any one of Embodiments 1-25, the method comprising:
heating a reactive media starting material mixture to at least partially vitrify the reactive media starting material and provide the reactive media, wherein
about 50 wt % to about 80 wt % of the reactive media starting material mixture is a non-clumping clay,
about 1 wt % to about 30 wt % of the reactive media starting material mixture is dolomite,
about 0.1 wt % to about 10 wt % of the reactive media starting material mixture is $CaCO_3$,
about 0.01 wt % to about 5 wt % of the reactive media starting material mixture is CaO,
about 1 wt % to about 20 wt % of the reactive media starting material mixture is peat, and
about 0 wt % to about 30 wt % of the reactive media starting material mixture is water.

Embodiment 99 provides the reactive media or method of any one or any combination of Embodiments 1-98 optionally configured such that all elements or options recited are available to use or select from.

What is claimed is:

1. A method of using a reactive media, the method comprising:
contacting water comprising an anionic material with the reactive media to form a solid calcium salt, wherein the reactive media comprises a vitrified reactive media starting material mixture, the reactive media starting material mixture comprising an organic material comprising peat, wherein the reactive media comprises
a ceramic; and
a reactive calcium available to form a solid calcium salt with the anionic material.

2. The method of claim 1, wherein the ceramic comprises a calcium silicate, an iron silicate, an aluminum silicate, an other silicate, or a combination thereof.

3. The method of claim 1, wherein the reactive calcium as CaO is about 14 wt % to about 18 wt % of the reactive media.

4. The method of claim 1, wherein the reactive calcium is comprised in a calcium material that is a calcium salt, an inorganic calcium compound, or a combination thereof.

5. The method of claim 4, wherein the calcium material reacts with the anionic material to form the solid calcium salt at a pH of about 9 to about 14.

6. The method of claim 4, wherein the calcium material is CaO, $Ca(OH)_2$, or a combination thereof.

7. The method of claim 4, wherein the anionic material comprises an anionic impurity, wherein the calcium material reacts with the anionic impurity to form the solid calcium salt.

8. The method of claim 1, wherein about 0.01 wt % to about 30 wt % of the reactive media is magnesium.

9. The method of claim 1, wherein the reactive media comprises:
the ceramic that is about 80 wt % to about 99 wt % of the reactive media; and
the reactive calcium that is available to form a solid calcium salt at pH of about 9 to about 14 with phosphate or carbonate in aqueous solution, wherein the reactive calcium as CaO is about 14 wt % to about 18 wt % of the reactive media, wherein the reactive calcium is in the form of a water-soluble salt or inorganic compound including the reactive calcium.

10. The method of claim 9, wherein during the contacting of the water comprising the anionic material with the reactive media the water comprising the anionic material has a pH of about 9 to about 14.

11. The method of claim 1, wherein the method further comprises:
heating the reactive media starting material mixture, to provide the reactive media.

12. The method of claim 1, wherein the reactive media starting material comprises a clay source, a calcium source, a magnesium source, and the organic material, wherein optionally the calcium source and the magnesium source are the same.

13. The method of claim 1, wherein the reactive media starting material comprises a non-clumping clay, CaO, doloinitic limestone, the peat, and water.

14. The method of claim 11, wherein the temperature used during formation of the reactive media from the reactive media starting material does not exceed about 1,070° C.

15. The method of claim 1, wherein the method further comprises:
heating a reactive media starting material mixture comprising about 83% to about 90 mol % Si relative to a total amount of Si and Ca in the reactive media starting material mixture to a temperature that does not exceed about 1,070° C., to at least partially vitrify the reactive media starting material and provide the reactive media.

16. The method of claim 1, wherein the method further comprises:
heating a reactive media starting material mixture comprising a non-clumping clay, dolomitic limestone, CaO, and the peat, to at least partially vitrify the reactive media starting material and provide the reactive media.

17. The method of claim 1, wherein the method further comprises:
heating a reactive media starting material mixture to at least partially vitrify the reactive media starting material and provide the reactive media, wherein
about 50 wt % to about 80 wt % of the reactive media starting material mixture is a non-clumping clay,
about 5 wt % to about 20 wt % of the reactive media starting material mixture is dolomitic limestone, such that about 0.1 wt % to about 5 wt % of the reactive media starting material is magnesium,
about 0.1 wt % to about 10 wt % of the reactive media starting material mixture is $CaCO_3$,
about 0.01 wt % to about 5 wt % of the reactive media starting material mixture is CaO,
about 1 wt % to about 20 wt % of the reactive media starting material mixture is the peat, and
about 0 wt % to about 30 wt % of the reactive media starting material mixture is water.

18. The method of claim 1, wherein the method further comprises:
heating a reactive media starting material mixture to at least partially vitrify the reactive media starting material and provide the reactive media, wherein
about 50 wt % to about 80 wt % of the reactive media starting material mixture is a non-clumping clay,
about 1 wt % to about 30 wt % of the reactive media starting material mixture is dolomite,
about 0.1 wt % to about 10 wt % of the reactive media starting material mixture is $CaCO_3$,
about 0.01 wt % to about 5 wt % of the reactive media starting material mixture is CaO,
about 1 wt % to about 20 wt % of the reactive media starting material mixture is the peat, and
about 0 wt % to about 30 wt % of the reactive media starting material mixture is water.

19. A method of using a reactive media, the method comprising:
contacting water comprising an anionic material with the reactive media to form a solid calcium salt, wherein the reactive media comprises a vitrified reactive media starting material mixture, the reactive media starting material mixture comprising a non-clumping clay, CaO, dolomitic limestone, peat, and water, wherein the reactive media comprises
a ceramic; and
a reactive calcium available to form a solid calcium salt with the anionic material.

20. A method of using a reactive media; the method comprising:
contacting water comprising an anionic material with the reactive media to form a solid calcium salt, wherein the reactive media comprises a vitrified reactive media starting material mixture, the reactive media starting material mixture comprises about 83% to about 90 mol % Si relative to a total amount of Si and Ca in the reactive media starting material mixture, wherein the reactive media comprises
a ceramic; and
a reactive calcium available to form a solid calcium salt with the anionic material.

* * * * *